US012739286B2

(12) United States Patent
Hoffpauir, IV

(10) Patent No.: US 12,739,286 B2
(45) **Date of Patent: *Sep. 15, 2026**

(54) METHODS AND APPARATUS FOR PERFORMING TARGETED LAWFUL INTERCEPT IN A SYSTEM INCLUDING CONTENT DELIVERY NETWORKS

(71) Applicant: Charter Communications Operating, LLC, St. Louis, MO (US)

(72) Inventor: Girard Hoffpauir, IV, Austin, TX (US)

(73) Assignee: Charter Communications Operating, LLC, St. Louis, MO (US)

( * ) Notice: Subject to any disclaimer, the term of this patent is extended or adjusted under 35 U.S.C. 154(b) by 38 days.

This patent is subject to a terminal disclaimer.

(21) Appl. No.: 18/922,294

(22) Filed: Oct. 21, 2024

(65) Prior Publication Data

US 2025/0047721 A1 Feb. 6, 2025

Related U.S. Application Data

(63) Continuation of application No. 17/571,418, filed on Jan. 7, 2022, now Pat. No. 12,126,659.

(51) Int. Cl.
*H04L 9/40* (2022.01)

(52) U.S. Cl.
CPC ........ *H04L 63/306* (2013.01); *H04L 63/0263* (2013.01); *H04L 63/0428* (2013.01)

(58) Field of Classification Search
CPC .................................................... H04L 63/306
See application file for complete search history.

(56) References Cited

U.S. PATENT DOCUMENTS

2009/0094245 A1* 4/2009 Kemns .................. G06F 16/113 707/999.009
2011/0145396 A1* 6/2011 Kim ........................ H04L 63/00 709/224
2015/0009864 A1* 1/2015 Kim .................... H04M 3/2281 370/259
2021/0144184 A1* 5/2021 Wong ................. H04L 65/1069

* cited by examiner

*Primary Examiner* — Simon P Kanaan
(74) *Attorney, Agent, or Firm* — Straub & Straub; Michael P. Straub; Stephen T. Straub

(57) ABSTRACT

Methods and apparatus for filtering lawfully intercepted encrypted traffic are described. A communications service provider network includes a mediation device and a security device. The mediation device receives a provisioned intercept request including a target IP address and one or more unique identifies corresponding to the target. The security device acquires certificates and private keys corresponding to one or more content distribution networks of interest for which intercepted traffic is to be partially or fully discarded. The mediation device receives filtering requests specifying filtering rules to be applied. Intercepted traffic is processed by the mediation device operating in conjunction with the security device to attempt decryption and identify the corresponding CDN network for the intercepted traffic. The mediation devices filters the decrypted traffic in accordance with the filtering rules, discarding traffic that is not of interest to the law enforcement agency (LEA) and sending traffic of interest to the LEA.

20 Claims, 21 Drawing Sheets

| FIGURE 2A |
| --- |
| FIGURE 2B |
| FIGURE 2C |
| FIGURE 2D |
| FIGURE 2E |
| FIGURE 2F |
| FIGURE 2G |
| FIGURE 2H |

FIGURE 2

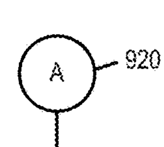

RECEIVE, AT THE MEDIATION DEVICE, A SECOND FILTERING REQUEST SPECIFYING A SECOND FILTERING RULE, SAID SECOND FILTERING RULE BEING THAT INTERCEPTED CONTENT CORRESPONDING TO A SECOND CONTENT DELIVERY NETWORK AND THE FIRST TARGET DEVICE IS TO FORWARDED TO THE LAW ENFORCEMENT DEVICE BUT THAT SECOND CONTENT DELIVERY NETWORK TRAFFIC CORRESPONDING TO THE OTHER USER DEVICES IS NOT TO BE FORWARDED TO THE LAW ENFORCEMENT DEVICE — 922

SIGNALING, IN RESPONSE TO RECEIVING THE SECOND FILTERING REQUEST, TO THE SECURITY DEVICE, THAT THE SECURITY DEVICE SHOULD OBTAIN A PRIVATE KEY FOR THE SECOND CONTENT DELIVERY NETWORK IF IT DOES NOT HAVE SUCH A KEY — 924

CHECKING, AT THE SECURITY DEVICE IF THE SECURITY DEVICE ALREADY HAS A VALID PRIVATE KEY CORRESPONDING TO THE SECOND CONTENT DELIVERY NETWORK — 926

OPERATING THE SECURITY DEVICE TO REQUEST A PRIVATE KEY CORRESPONDING TO THE SECOND CONTENT DELIVERY NETWORK IN RESPONSE TO DETERMINING THAT THE SECURITY DEVICE DOES NOT HAVE A VALID PRIVATE KEY FOR THE SECOND CONTENT DELIVERY NETWORK — 928

SEND, FROM THE SECURITY DEVICE, A REQUEST FOR A PRIVATE KEY CORRESPONDING TO THE SECOND CONTENT DELIVERY NETWORK — 930

RECEIVE, AT THE SECURITY DEVICE, A PRIVATE KEY CORRESPONDING TO THE SECOND CONTENT DELIVERY NETWORK — 932

| FIGURE 5A |
| --- |
| FIGURE 5B |
| FIGURE 5C |
| FIGURE 5D |
| FIGURE 5E |
| FIGURE 5F |

Figure 6:
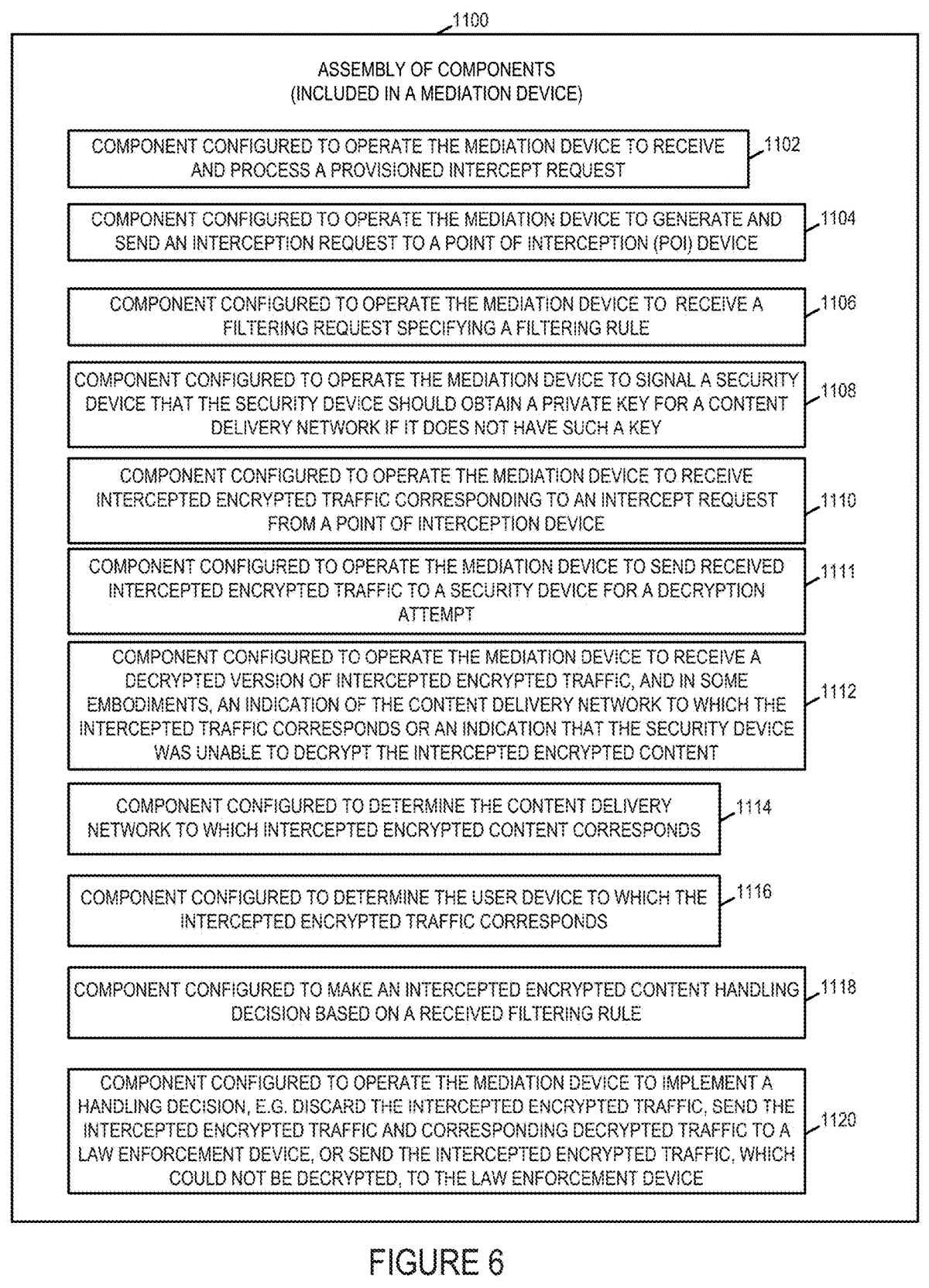

ASSEMBLY OF COMPONENTS
(INCLUDED IN A MEDIATION DEVICE)

COMPONENT CONFIGURED TO OPERATE THE MEDIATION DEVICE TO RECEIVE AND PROCESS A PROVISIONED INTERCEPT REQUEST 1102

COMPONENT CONFIGURED TO OPERATE THE MEDIATION DEVICE TO GENERATE AND SEND AN INTERCEPTION REQUEST TO A POINT OF INTERCEPTION (POI) DEVICE 1104

COMPONENT CONFIGURED TO OPERATE THE MEDIATION DEVICE TO RECEIVE A FILTERING REQUEST SPECIFYING A FILTERING RULE 1106

COMPONENT CONFIGURED TO OPERATE THE MEDIATION DEVICE TO SIGNAL A SECURITY DEVICE THAT THE SECURITY DEVICE SHOULD OBTAIN A PRIVATE KEY FOR A CONTENT DELIVERY NETWORK IF IT DOES NOT HAVE SUCH A KEY 1108

COMPONENT CONFIGURED TO OPERATE THE MEDIATION DEVICE TO RECEIVE INTERCEPTED ENCRYPTED TRAFFIC CORRESPONDING TO AN INTERCEPT REQUEST FROM A POINT OF INTERCEPTION DEVICE 1110

COMPONENT CONFIGURED TO OPERATE THE MEDIATION DEVICE TO SEND RECEIVED INTERCEPTED ENCRYPTED TRAFFIC TO A SECURITY DEVICE FOR A DECRYPTION ATTEMPT 1111

COMPONENT CONFIGURED TO OPERATE THE MEDIATION DEVICE TO RECEIVE A DECRYPTED VERSION OF INTERCEPTED ENCRYPTED TRAFFIC, AND IN SOME EMBODIMENTS, AN INDICATION OF THE CONTENT DELIVERY NETWORK TO WHICH THE INTERCEPTED TRAFFIC CORRESPONDS OR AN INDICATION THAT THE SECURITY DEVICE WAS UNABLE TO DECRYPT THE INTERCEPTED ENCRYPTED CONTENT 1112

COMPONENT CONFIGURED TO DETERMINE THE CONTENT DELIVERY NETWORK TO WHICH INTERCEPTED ENCRYPTED CONTENT CORRESPONDS 1114

COMPONENT CONFIGURED TO DETERMINE THE USER DEVICE TO WHICH THE INTERCEPTED ENCRYPTED TRAFFIC CORRESPONDS 1116

COMPONENT CONFIGURED TO MAKE AN INTERCEPTED ENCRYPTED CONTENT HANDLING DECISION BASED ON A RECEIVED FILTERING RULE 1118

COMPONENT CONFIGURED TO OPERATE THE MEDIATION DEVICE TO IMPLEMENT A HANDLING DECISION, E.G. DISCARD THE INTERCEPTED ENCRYPTED TRAFFIC, SEND THE INTERCEPTED ENCRYPTED TRAFFIC AND CORRESPONDING DECRYPTED TRAFFIC TO A LAW ENFORCEMENT DEVICE, OR SEND THE INTERCEPTED ENCRYPTED TRAFFIC, WHICH COULD NOT BE DECRYPTED, TO THE LAW ENFORCEMENT DEVICE 1120

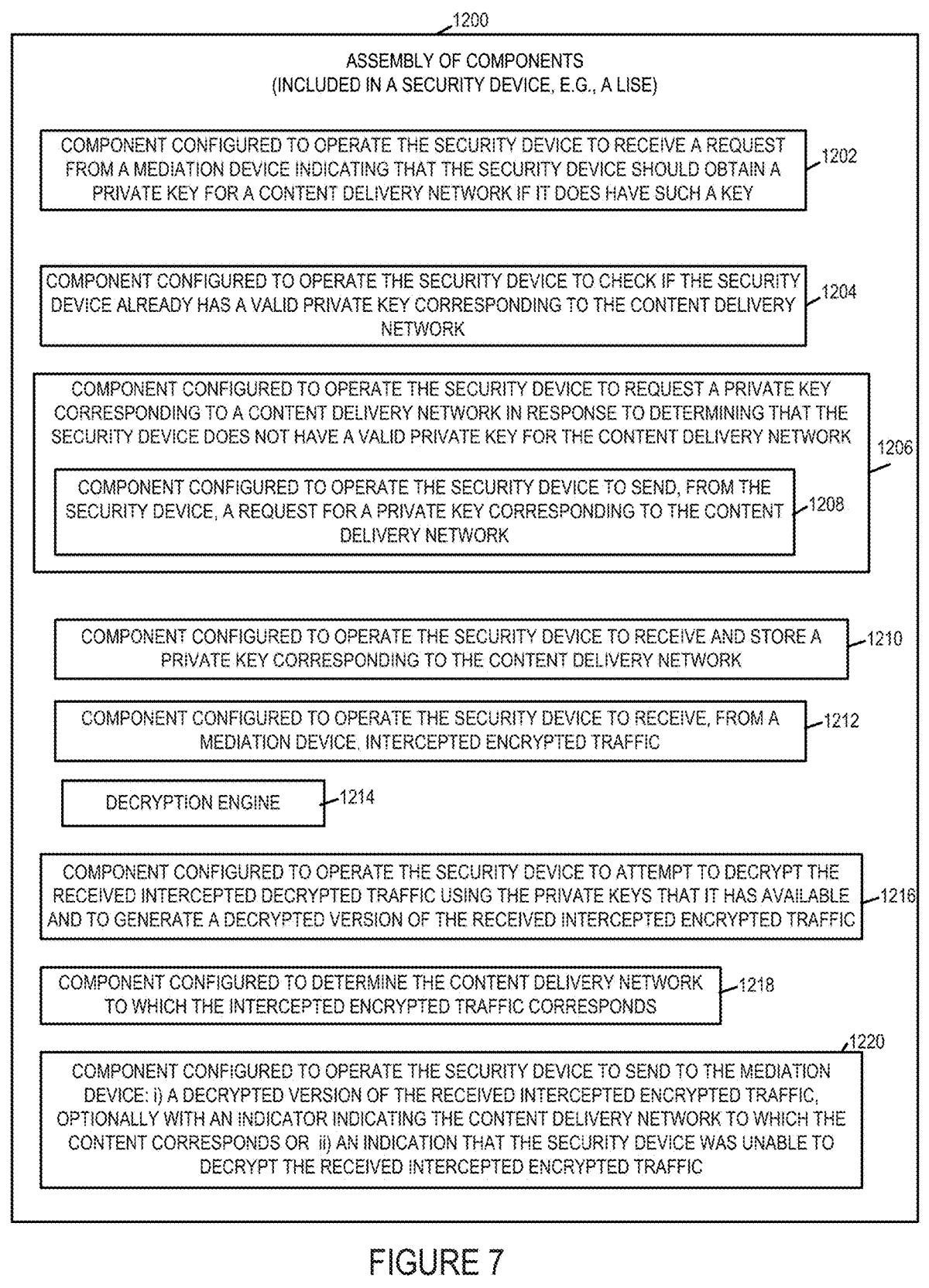

ASSEMBLY OF COMPONENTS
(INCLUDED IN A SECURITY DEVICE, E.G., A LISE)

COMPONENT CONFIGURED TO OPERATE THE SECURITY DEVICE TO RECEIVE A REQUEST FROM A MEDIATION DEVICE INDICATING THAT THE SECURITY DEVICE SHOULD OBTAIN A PRIVATE KEY FOR A CONTENT DELIVERY NETWORK IF IT DOES HAVE SUCH A KEY — 1202

COMPONENT CONFIGURED TO OPERATE THE SECURITY DEVICE TO CHECK IF THE SECURITY DEVICE ALREADY HAS A VALID PRIVATE KEY CORRESPONDING TO THE CONTENT DELIVERY NETWORK — 1204

COMPONENT CONFIGURED TO OPERATE THE SECURITY DEVICE TO REQUEST A PRIVATE KEY CORRESPONDING TO A CONTENT DELIVERY NETWORK IN RESPONSE TO DETERMINING THAT THE SECURITY DEVICE DOES NOT HAVE A VALID PRIVATE KEY FOR THE CONTENT DELIVERY NETWORK — 1206

COMPONENT CONFIGURED TO OPERATE THE SECURITY DEVICE TO SEND, FROM THE SECURITY DEVICE, A REQUEST FOR A PRIVATE KEY CORRESPONDING TO THE CONTENT DELIVERY NETWORK — 1208

COMPONENT CONFIGURED TO OPERATE THE SECURITY DEVICE TO RECEIVE AND STORE A PRIVATE KEY CORRESPONDING TO THE CONTENT DELIVERY NETWORK — 1210

COMPONENT CONFIGURED TO OPERATE THE SECURITY DEVICE TO RECEIVE, FROM A MEDIATION DEVICE, INTERCEPTED ENCRYPTED TRAFFIC — 1212

DECRYPTION ENGINE — 1214

COMPONENT CONFIGURED TO OPERATE THE SECURITY DEVICE TO ATTEMPT TO DECRYPT THE RECEIVED INTERCEPTED DECRYPTED TRAFFIC USING THE PRIVATE KEYS THAT IT HAS AVAILABLE AND TO GENERATE A DECRYPTED VERSION OF THE RECEIVED INTERCEPTED ENCRYPTED TRAFFIC — 1216

COMPONENT CONFIGURED TO DETERMINE THE CONTENT DELIVERY NETWORK TO WHICH THE INTERCEPTED ENCRYPTED TRAFFIC CORRESPONDS — 1218

COMPONENT CONFIGURED TO OPERATE THE SECURITY DEVICE TO SEND TO THE MEDIATION DEVICE: i) A DECRYPTED VERSION OF THE RECEIVED INTERCEPTED ENCRYPTED TRAFFIC, OPTIONALLY WITH AN INDICATOR INDICATING THE CONTENT DELIVERY NETWORK TO WHICH THE CONTENT CORRESPONDS OR ii) AN INDICATION THAT THE SECURITY DEVICE WAS UNABLE TO DECRYPT THE RECEIVED INTERCEPTED ENCRYPTED TRAFFIC — 1220

FIGURE 7

METHODS AND APPARATUS FOR PERFORMING TARGETED LAWFUL INTERCEPT IN A SYSTEM INCLUDING CONTENT DELIVERY NETWORKS

RELATED APPLICATIONS

The present application is a continuation of U.S. patent application Ser. No. 17/571,418 filed Jan. 7, 2022 which was Published on Jul. 13, 2023 as Publication No.: US 2023-0224336 A1 and which is hereby expressly incorporated by reference in its entirety.

FIELD

The present application relates to lawful intercept and, more particularly, to methods and apparatus for performing targeted lawful intercept in a system including a mediation device supporting filtering and one or more content delivery networks.

BACKGROUND

To deliver better services to consumers, there is a constant need to increase internet speeds to consumers from every Internet Service Providers (ISP) globally. Over time more and more video content is being shifted to being delivered over IP from other more traditional methods. It is expected that IP Video will represent 82% of all traffic. This increase has a knock-on effect on the amount of data being delivered to all services as well as for Lawful Intercept. Commercial IP Video has limited investigative value in an intercept for law enforcement due to its generic nature. As a result, there are cases where it would be desirable to exclude IP Video out of delivery to Law Enforcement to save bandwidth and processing requirements.

Typically, Content Delivery Networks (CDNs) are communicating traffic to user devices in encrypted form using certificates and keys, which makes filtering difficult by a service provider's device, which does not have access to the private keys. Typically, the law enforcement network are able to acquire access to the private keys of the CDNs, allowing for decryption within the law enforcement network.

Based on the above, there is a need for new method and apparatus for supporting lawful intercept which will reduce the amount of intercepted traffic sent back to a law enforcement network for processing and evaluation.

SUMMARY

Methods and apparatus for performing filtering of lawfully intercepted content delivery network (CDN) traffic corresponding to intercept target are described. A lawful intercept mediation device (MD) serves as an intermediary device between a point of intercept (POI) device, e.g., a switch, and a law enforcement network. The mediation device receives a provisioned lawful intercept including target IDs, e.g., an IP address corresponding to the target and one or more unique identifiers, e.g., MAC address, IMEI, IMSI, and/or T/N corresponding to the target. The mediation device sends an intercept request to the POI device which includes the IP address of the target. The IP address of the target may, and sometimes does, correspond to additional devices in addition to the target, which are using the same IP address at a site.

The mediation device also receives one or more filtering requests corresponding to one or more CDNs. A filtering request communicates a rule for filtering intercepted CDN traffic, e.g., to discard intercepted traffic that is not of interest to the law enforcement agency. The mediation device signals a security device, e.g., a law intercept secrets engine (LISE) including a decryption engine, notifying the security device to acquire a certificate and a corresponding private key corresponding to a particular CDN of interest, if it does not already have a valid copy for that CDN. If necessary, the security devices acquires and stores the certificate and private key for each of one or more CDNs of interest. The security device can and sometimes is included in the mediation device but in other embodiments the security device is a separate physical entity from the mediation device. In cases where the security device is a separate physical entity from the mediation device the security device can and sometimes does provide encryption services to multiple mediation devices. In such embodiments the number of mediation devices may and sometimes does exceed the number of security devices with the mediation devices being coupled to the mediation device by secure network connections, e.g., connections protected by encryption and/or other security measures. Since the mediation devices and security devices are both outside the law enforcement system/network the data traffic burden is still reduced in such embodiments with respect to the law enforcement network and/or system since traffic if filtered before reaching the law enforcement system.

The POI intercepts encrypted traffic corresponding the intercept request, e.g. based on IP address, and the intercepted encrypted traffic is sent from the POI device to the mediation device. The mediation device sends the intercepted encrypted traffic to the security device for a decryption attempt. The security device attempts to decrypt the received intercepted encrypted traffic using the private keys that it has available. If successful, the security device sends a decrypted version of the intercepted encrypted traffic to the mediation device, and in some embodiments, an indication as to which CDN the intercepted traffic corresponds.

The mediation device filters the received decrypted traffic in accordance with the previously received filtering request, e.g., discarding intercepted traffic that is not of interest to the law enforcement agency. Decrypted filtered traffic that is not filtered out, e.g., is not discarded, is sent back to a law enforcement device along with the corresponding intercepted encrypted traffic to maintain chain of custody.

An exemplary communications method, in accordance with some embodiments, comprises: receiving at a mediation device first intercepted encrypted traffic corresponding to a first intercept request from a point of interception device; communicating the first intercepted encrypted traffic to a security device which includes one or more private keys corresponding to one or more content delivery networks; receiving a decrypted version of the first intercepted encrypted traffic; and making, at the mediation device, a first intercepted encrypted traffic handling decision based on a filtering rule that depends on what content delivery network the first intercepted encrypted traffic corresponds to, said traffic handling decision including a decision to: i) discard at least some of said first intercepted encrypted traffic without forwarding to a law enforcement device or ii) forward as least some of said first intercepted traffic to a law enforcement device.

All of the features discussed in the above summary are not included in all embodiments and it should be appreciated that various embodiments include different combinations of features.

Numerous features and variations on the above described methods and apparatus are possible. Various embodiments, features and variations are described in more detail in the detailed description which follows.

The detailed description which follows describes additional features, details and embodiments which can be used alone or in combination.

BRIEF DESCRIPTION OF THE FIGURES

FIG. 2 comprises the combination of FIG. 2A, FIG. 2B, FIG. 2C, FIG. 2D, FIG. 2E, FIG. 2F, FIG. 2G and FIG. 2H.

FIG. 5B is a second part of a flowchart of an exemplary communications method in accordance with an exemplary embodiment, said exemplary method included filtering of lawfully intercepted data corresponding to a target.

FIG. 5 comprises the combination of FIG. 5A, FIG. 5B, FIG. 5C, FIG. 5D, FIG. 5E and FIG. 5F.

FIG. 6 is a drawing of an exemplary assembly of components, which may be included in a mediation device in accordance with an exemplary embodiment.

FIG. 7 is a drawing of an exemplary assembly of components, which may be included in a security device, e.g., a LISE, in accordance with an exemplary embodiment.

DETAILED DESCRIPTION

Figure 1:
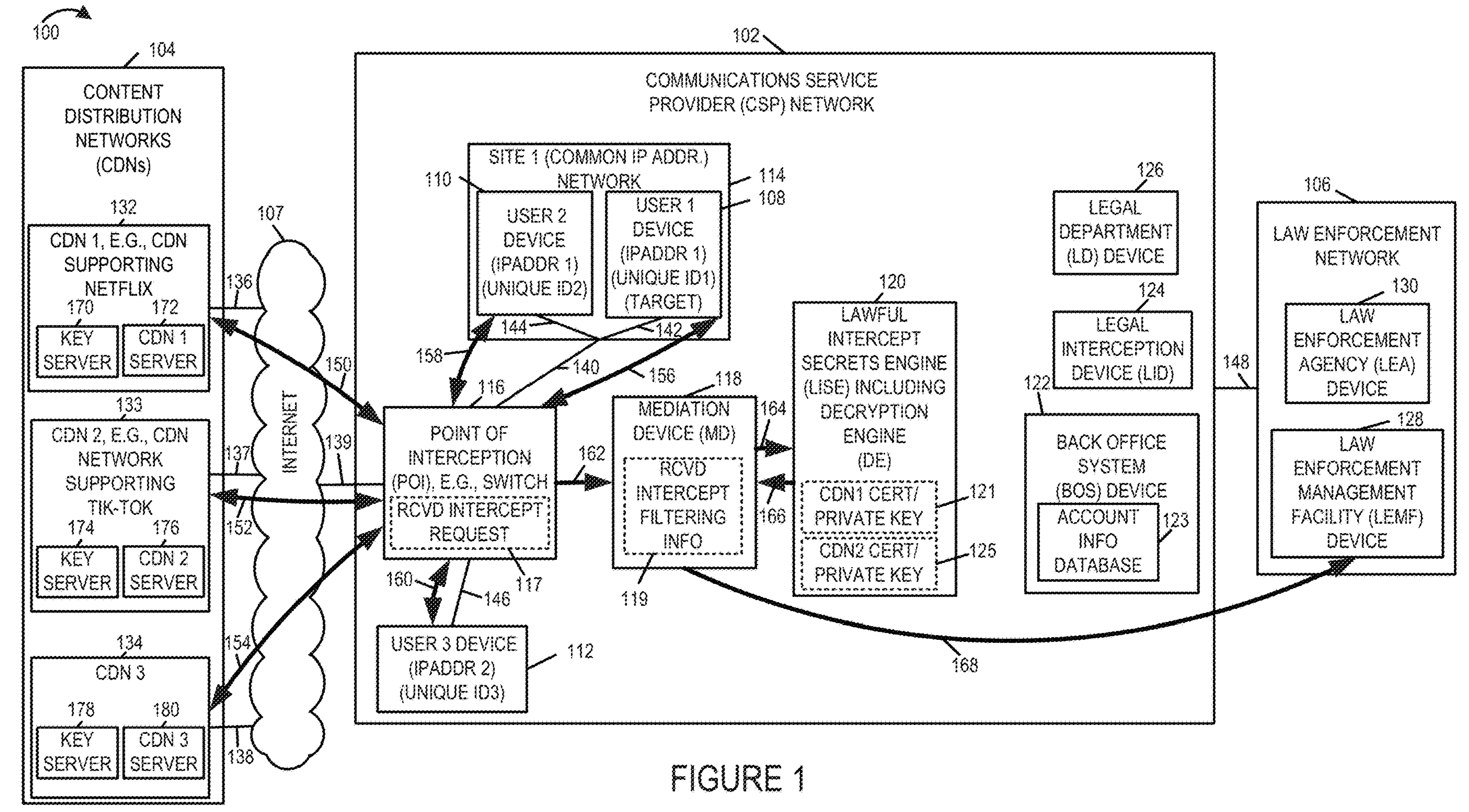
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes a communications service provider (CSP) network 102, content distribution networks (CDNs) 104 and a law enforcement network 106 coupled together as shown.

The CSP network 102 includes a plurality of user devices including user device 1 108, user device 2 110 and user device 3 112. User device 1 108, which is the exemplary intercept target, has one or more unique identifiers including unique ID1, and is using IP address IPADDR1. User device 2 110, has one or more unique identifiers including unique ID2, and is using IP address IPADDR1. User device 1 108 and user device 2 110 are co-located as site 1 and are using site 1 network 114, which has the common IP address, IPADDR1. User device 3 112, has one or more unique identifiers including unique ID3, and is using a different IP address, which is IPADDR2. The CSP network 102 further includes a point of interception (POI) device 116, e.g., a switch, a mediation device (MD) 118, a lawful intercept secrets engine (LISE) 120 including a decryption engine (DE), a legal department (LD) device 126, e.g., a LD server, a legal interception device (LID) 124, and a back office system (BOS) device. The various devices 108, 110, 112, 116, 118, 120, 122, 124, 126 within the CSP network 102 are coupled together via network links, other network devices, e.g., routers, and/or the Internet. POI device 116 is shown coupled to the site 1 network 140 via communications link 140. POI device 116 is coupled to user device 1 108 via communications links 140, 142. POI device 116 is coupled to user device 2 110 via communications links 140, 144. POI device 116 is coupled to user device 3 112 via communications links 146.

Content distributions networks 104 includes content distribution network 1 (CDN1) 132, content distribution network 2 (CDN2) 133, and content distribution network 3 (CDN3) 134. CDN1 132, e.g., a CDN supporting NETFLIX, includes a key server 170 and a content network server, CDN1 server 172. CDN2 133, e.g., a CDN supporting TIK-TOK, includes a key server 174 and a content network server, CDN2 server 176. CDN3 134 includes a key server 178 and a content network server, CDN3 server 178. CDN1 132 is coupled to POI device 116 via communications link 136, Internet 107 and communications link 139. CDN2 133 is coupled to POI device 116 via communications link 137, Internet 107 and communications link 139. CDN3 134 is coupled to POI device 116 via communications link 138, Internet 107 and communications link 139.

Law enforcement network 106 is coupled to the CSP network 102 via communications link 148. Law enforcement network 106 includes a law enforcement agency (LEA) device 130 and a law enforcement management facility (LEMF) device 128 coupled together and to communications link 148, e.g., via an internal law enforcement network communications links, other communications links, routers, other network devices, coupling devices, and/or the Internet.

Point of interception (POI) device 116 can be, and sometimes is, configured to lawfully intercept communications, e.g., based on information including an IP address of an interception target. In this example POI device 116 includes a received intercept request 117, which targets IPADDR1, which corresponds to user device 1 108, which is the target. Mediation device 118 can be, and sometimes is, configured to filter intercepted traffic, e.g., received from the POI device 116 based on received filtering information. The received intercepted traffic may be, and sometimes is encrypted. In this example, mediation device 118 includes received intercept filtering information 119, e.g., filtering information, e.g. filtering rules, applicable to intercepted traffic corresponding to the target and CDN1 and filtering information, e.g, filtering rules, applicable to intercepted data corresponding to the target and CDN2. Lawful intercept secrets engine 120 can, and sometimes does, include one or more certificate/private key sets of information, which can be used to decrypt intercepted encrypted traffic. In this example, USE 120 includes CDN1 certificate/private key 121 and CDN2 certificate/private key 125. Back-office system (BOS) device 122 includes an account information database 123, which includes account information including an IP address and one or more unique device identifiers corresponding to an account number of a potential intercept target.

In the example of FIG. 1, assume that user device 1 108 (which is the target) is, e.g., at different times, communicating with CDN1 device 132, CDN2 133, CDN3 134, and user 3 device 112. Also assume, that user device 2 is, e.g., at different times, communicating with CDN1 132, CDN2 133, and CDN3 134. Bi-directional arrow 150 represents exemplary traffic signals between CDN1 device 172 and POI device 116. Bi-directional arrow 152 represents exemplary traffic signals between CDN2 device 176 and POI device 116. Arrow 154 represents exemplary traffic signals between CDN3 device 180 and POI device 116. Bi-directional arrow 156 represents exemplary traffic signals between POI device 116 and user 1 device 108. Bi-directional arrow 158 represents exemplary traffic signals between POI device 116 and user 2 device 110. Bi-directional arrow 160 represents exemplary traffic signals between user device 3 112 and user 1 device 108.

Arrow 162 represented encapsulated intercepted traffic corresponding to the IP address of the target, which is IPADDR1. Arrow 164 represents forwarded intercepted encrypted traffic, sent to the USE 120 for attempted decryption, using the decryption keys available to USE 120. Arrow 166 represents decrypted traffic, and in some embodiments and indication of the CDN to which the decrypted traffic corresponds, or an indication that decryption attempt was unsuccessful. Successfully decrypted traffic received by the mediation device is subjected to filtering in accordance with the received filtering information (filtering rules) 119, e.g., to limit the amount of information sent to the LEMF 128 for processing, e.g., discarding, when possible, intercepted traffic which is not of interest to the LEA 130. Arrow 168 represents filtered decrypted intercepted traffic and the corresponding intercepted encrypted traffic (to maintain chain of custody) and/or intercepted encrypted traffic which could not be decrypted, which is being sent to the LEMF 128.

FIG. 2, comprising the combination of FIG. 2A, FIG. 2B, FIG. 2C, FIG. 2D, FIG. 2E, FIG. 2F, FIG. 2G and FIG. 2H, is a signaling diagram 200 of an exemplary method of operating a communication system, e.g., communications system 100 of FIG. 1, in accordance with an exemplary embodiment.

Figure 2A:
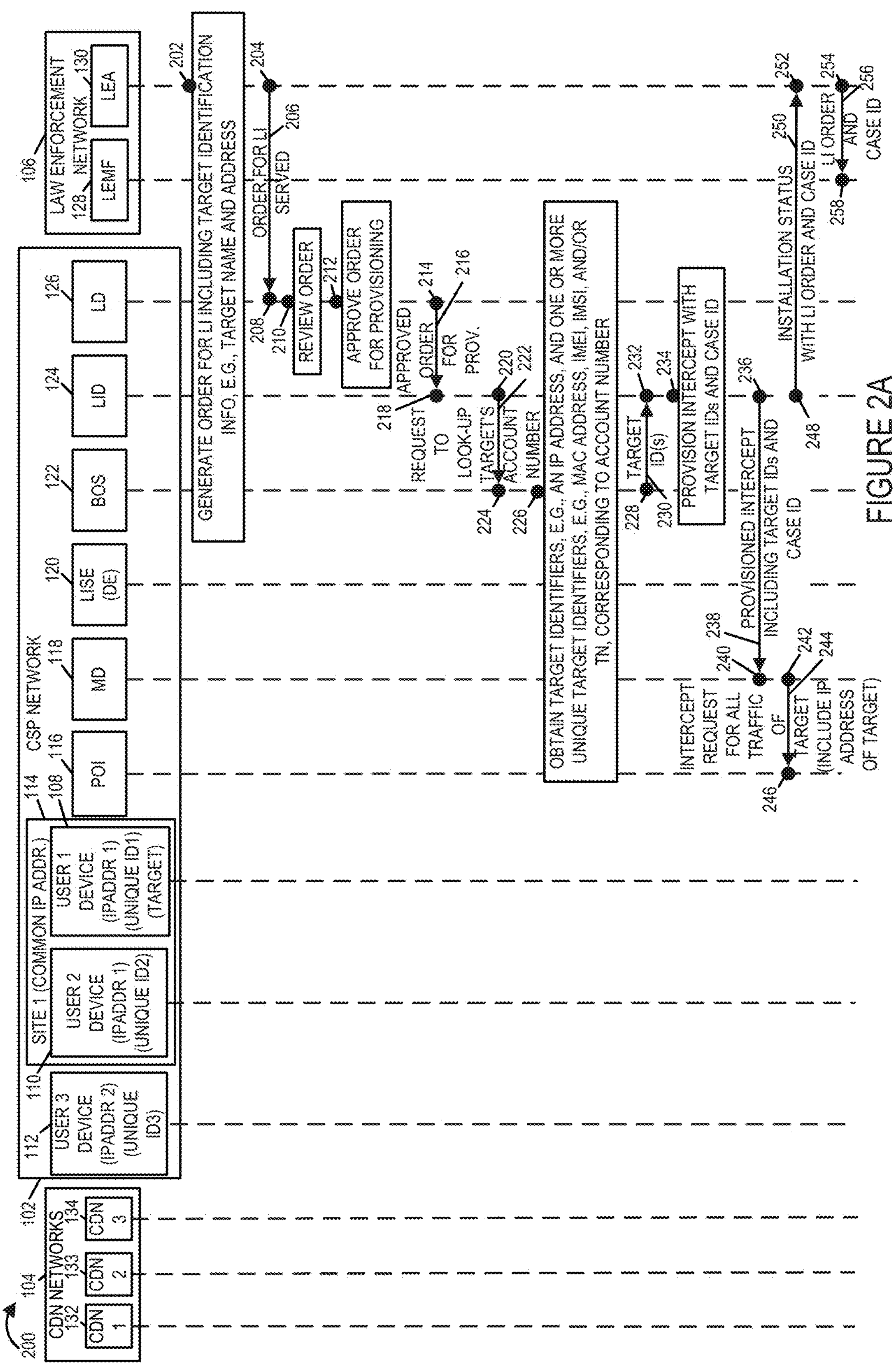
FIG. 2A is a drawing of a first part of an exemplary signaling diagram of an exemplary method of operating a communications system in accordance with an exemplary embodiment, said exemplary method including filtering of lawfully intercepted data corresponding to a target.

FIG. 2A, which includes generation, review, provisioning, and delivery of a lawful intercept order corresponding to an identified target, will now be described.

In step 202 law enforcement agency (LEA) device 130 generates an order for lawful intercept (LI) including target identification information, e.g., a target name and address. Operation proceeds from step 202 to step 204.

In step 204 the LEA device 204 sends the generated order for LI intercept 206 to the legal department (LD) device 126 of the communications service provider (CSP) network 102. In step 208, the LD device 126 receives the order. In step 210, the LD device 126 reviews the order. In step 210 the LD device 212 approves the order for provisioning. In step 214 the LD device 126 sends the approved LI order 216 to the lawful interception department (LID) device 124 for provisioning. In step 218 the LID device 124 receives the approved LI order for provisioning, and in step 220 the LID 124 generates and sends a request 222 to look-up the target's account number to the back office system (BOS) 122. In step 224, the BOS 122 receives the request 222 and obtains the target's account number. In step 226 the BOS 122 obtains target identifiers, e.g., an IP address, and one more unique target identifiers, e.g., a Media Access Control (MAC) address, an International Mobile Equipment Identify (IMEI), International Mobile Subscriber Identity (IMSI) and/or telephone number or terminal number (TN), corresponding to the account number of the target. In step 228 the BOS 122 generates and sends message 230 including target ID(s) to the LID 124. In step 232 the LID 124 receives message 230 and recover the communicated target IDs. In step 234 the LID 124 provisions the intercept with target IDs and a case ID. In step 236, the LID 124 sends the provisioned intercept including target IDs and the case ID 238 to the mediation device (MD) 118. In step 240 the MD 118 receives the provisioned intercept including target IDs and the case ID 238, recovers the communicated information, and stores the recovered information. In step 242 the MD 118 generates and sends an intercept request 244 for all traffic of the target to the point of intercept (POI) device 116, e.g., a switch. The intercept request 244 includes the IP address of the target. In step 246 the POI device 116 receives the intercept request 244.

In step 248 the LID 124 generates and sends message 250 including installation status, e.g., installation complete, with the LI order and case ID to the LEA device 130. In step 252 the LEA device 130 receives message 250, and in response, in step 254 the LEA device 130 generates and sends a copy of the LI order and case ID 256 to the LEMF 126 which receives and stores the information in step 258.

Figure 2B:
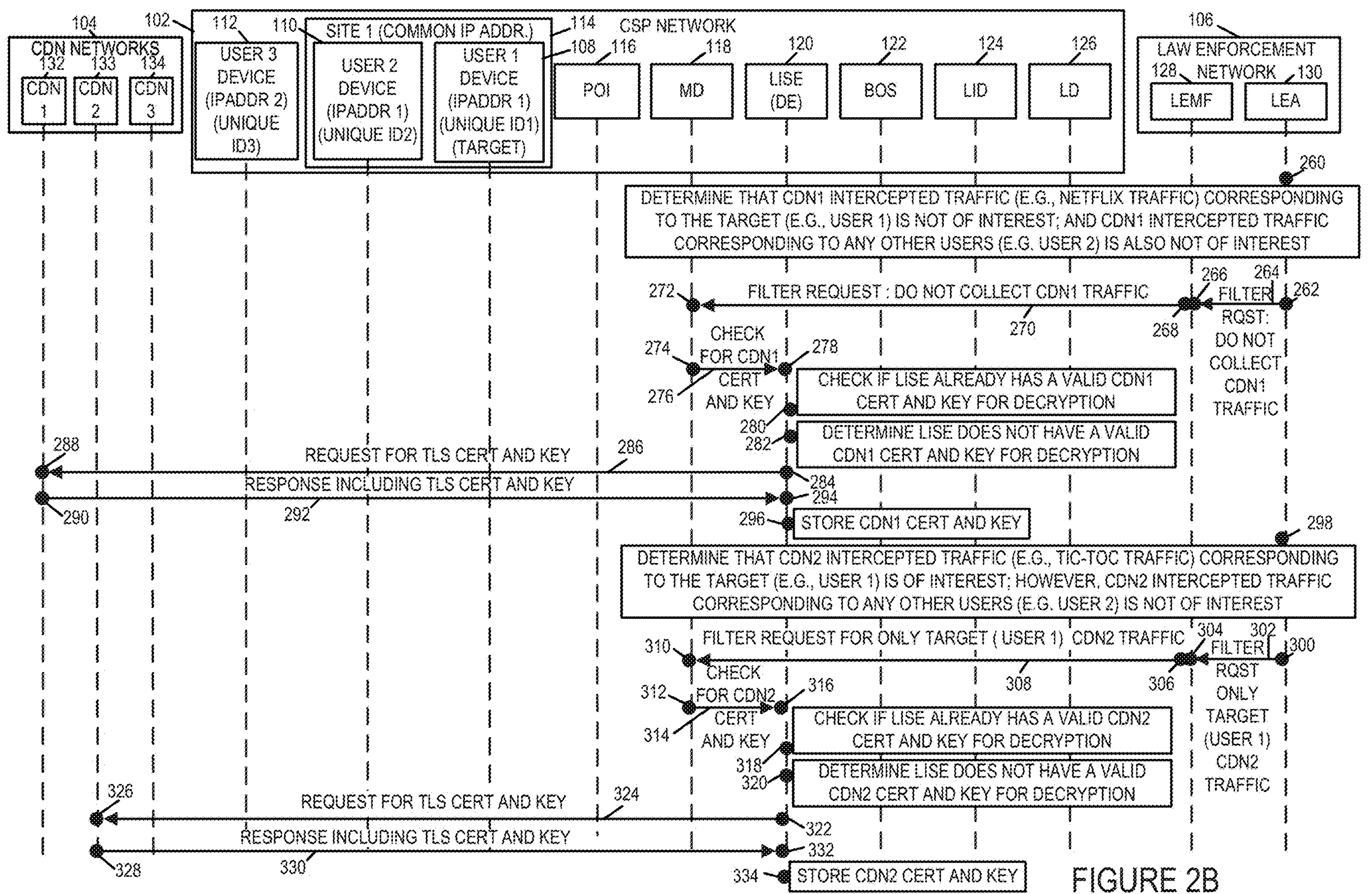
FIG. 2B is a drawing of a second part of an exemplary signaling diagram of an exemplary method of operating a communications system in accordance with an exemplary embodiment, said exemplary method including filtering of lawfully intercepted data corresponding to a target.

FIG. 2B, which includes generation and delivery of filter requests corresponding to an intercept target and acquisition of TLS certificates and corresponding private keys corresponding to CDNs used by the target, will now be described.

In step 260 the LEA 130 determines that CDN1 intercepted traffic, e.g., Netflix traffic, corresponding to the target (e.g., user 1) is not of interest; and CDN1 intercepted traffic corresponding to any other users (e.g., user 2) with the same IP address as the target, is also not of interest. In step 262 the LEA 130 generates and sends filter request 264 indicating do not collect CDN1 traffic, to the LEMF 128. In step 266 the LEMF receives the filter request 264, and in response, in step 268 the LEMF 128 generates and sends filter request 270 indicating do not collect CDN1 traffic to the MD 118. In step 272, the MD 118 receives the filter request 270 and stores the filter request. In step 274 the MD 118 generates and sends message 276 including a request to check for a CDN1 certificate and private key to the lawful interception secrets engine (LISE) 120.

A certificate contains a public key. The certificate, in addition to containing the public key, contains additional information such as issuer, what the certificate is supposed to be used for, and other types of metadata. Typically, a certificate is itself signed by a certificate authority (CA) using CA's private key. This verifies the authenticity of the certificate. The private key is used to decrypt information encrypted with the public certificate.

In step 278 the LISE 120 receives message 276, and in response, in step 280, the LISE 120 checks to determine if the LISE 120 already has a valid CDN1 certificate and corresponding private key for decryption. In this example, in step 282 the USE 120 determines that the USE does not have a valid CDN1 certificate and key for decryption. In response to the determination of step 282, the USE 120, in step 284 generates and sends a request 286 for a TLS certificate and private key to key server 170 of CDN1 132. In step 288 CDN1 132 receives the request 286. In step 290 key server 170 of CDN1 132 generates and sends response message 292 including a TLS certificate and private key to USE 120. In step 294 the USE 120 receives the response message 292, recovers the communicated CDN1 certificate and corresponding private key, and in step 296, stores the CDN1 certificate and private key.

In step 298 the LEA 130 determines that CDN2 intercepted traffic, e.g., TIK-TOK traffic, corresponding to the target (e.g., user 1) is of interest; however, CDN2 intercepted traffic corresponding to any other users (e.g., user 2) with the same IP address as the target, is not of interest. In step 300 the LEA 130 generates and sends filter request 302 indicating collect and send back only target (user 1) CDN2 traffic, to the LEMF 128. In step 304 the LEMF 128 receives the filter request 306, and in response, in step 306 the LEMF 128 generates and sends filter request 308 indicating only collect and send back target (user 1) CDN2 traffic to the MD 118. In step 310, the MD 118 receives the filter request 308 and stores the filter request. In step 312 the MD 118 generates and sends message 314 including a request to check for a CDN2 certificate and corresponding private key to the lawful interception secrets engine (LISE) 120. In step 316 the LISE 120 receives message 314, and in response, in step 318, the LISE 120 checks to determine if the LISE 120 already has a valid CDN2 certificate and corresponding private key for decryption. In this example, in step 320 the LISE 120 determines that the LISE 120 does not have a valid CDN2 certificate and private key for decryption. In response to the determination of step 320, the LISE 120, in step 322 generates and sends a request 324 for a TLS certificate and private key to CDN2 133. In step 326 CDN2 133 receives the request 324. In step 328 key server 174 of CDN2 133 generates and sends response message 330 including a TLS certificate and corresponding private key to LISE 120. In step 332 the LISE 120 receives the response message 330, recovers the communicated CDN2 certificate and private key, and in step 334, stores the CDN2 certificate and private key.

Figure 2C:
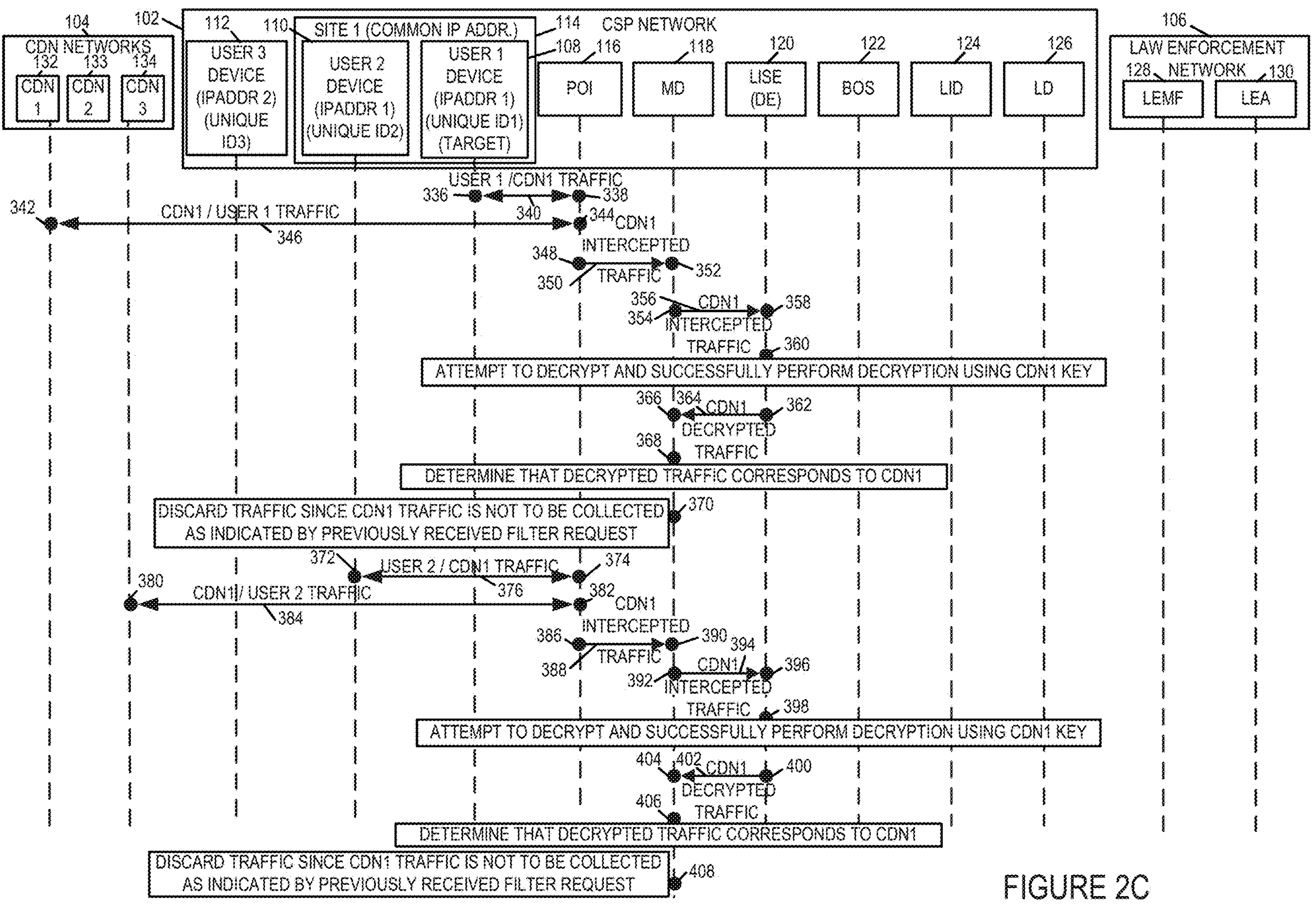
FIG. 2C is a drawing of a third part of an exemplary signaling diagram of an exemplary method of operating a communications system in accordance with an exemplary embodiment, said exemplary method including filtering of lawfully intercepted data corresponding to a target.

FIG. 2C, which illustrates an example of intercepted encrypted traffic corresponding to a first CDN network being decrypted, filtered and discarded based on the filter request (previously received in step 272), will now be described.

Traffic, e.g., bi-directional traffic, is being communicated between user 1 device 108 and CDN1 132, via POI device 116. In steps 336 and 338 user 1 device 108 and POI device 116 are operated to send and receive traffic signals 340. In steps 342 and 344 CDN1 132 and POI device 116 are operated to send and receive traffic signals 346. In step 348, POI device 116 intercepts traffic (340, 346), based on the received intercept request 244 (intercept all traffic thru POI based on source or destination IP address corresponding to the target), encapsulates the intercepted traffic, e.g., encapsulates intercepted IP packets in UDP packets, and sends the encapsulated intercepted traffic 350 to MD 118. In step 352 the MD 118 receives the encapsulated intercepted encrypted traffic. The intercepted traffic is encrypted, and the MD 118 is unaware, at this time, that the intercepted encrypted traffic corresponds to CDN1 132. In step 354, the MD 118 sends, e.g., forwards, the intercepted encrypted traffic, as signals 356, to the LISE 120 for decryption. In step 358, the LISE 120 receives the forwarded intercepted encrypted traffic. In step 360 the decryption engine (DE) of the LISE 120 attempts to decrypt the received intercepted encrypted traffic using the decryption keys that it has available, and the decryption engine is successfully able to decrypt the traffic using the CDN1 private key, which it received and stored in steps 294, 296. In step 362, the LISE 120 sends the decrypted traffic 364 to the MD 118. In step 366 the MD 118 receives the decrypted traffic, and in step 368 the MD 118 determines that the decrypted traffic corresponds to CDN1. In some embodiments, the determination that the decrypted traffic corresponds to CDN1 is based on the MD 116 evaluating the unencrypted traffic (received decrypted traffic) and recognizing an identifier corresponding to CDN1 132. In some embodiments, the determination that the decrypted traffic corresponds to CDN1 is based information communicated to MD 118 from LISE 120 (e.g., along with the decrypted traffic), which indicates that the successfully decrypted traffic was decrypted using a key corresponding to CDN1 or was signed with using a CDN1 key. In step 370, the MD 118 makes an intercepted traffic handling decision based on the determination that the traffic corresponds to CDN1 and the previously received filtering request 270, which includes a rule: do not collect CDN1 traffic. Thus, in step 370 the MD 118 decides that the traffic is not to be sent to the LEMF 128, and the MD 118 discards the traffic since it corresponds to CDN1.

Traffic, e.g., bi-directional traffic, is being communicated between user 2 device 110 and CDN1 132, via POI device 116. In steps 372 and 374 user 2 device 110 and POI device

116 are operated to send and receive traffic signals 376. In steps 380 and 382 CDN1 132 and POI device 116 are operated to send and receive traffic signals 384. In step 386, POI device 116 intercepts traffic (376, 384), based on the received intercept request 244 (intercept all traffic thru POI based on source or destination IP address corresponding to the target (note: user device 2 110 has the same IP address as target user device 1 108)), encapsulates the intercepted encrypted traffic, e.g., encapsulates intercepted IP packets in UDP packets, and sends the encapsulated intercepted encrypted traffic in signals 388 to MD 188, which the receives the intercepted encrypted traffic in step 390. The received intercepted traffic is encrypted, and the MD 118 is unaware, at this time, that the intercepted encrypted traffic corresponds to CDN1 132. In step 392, the MD sends, e.g., forwards, the intercepted encrypted traffic, as signals 394, to the USE 120 for decryption. In step 396, the USE 120 receives the forwarded intercepted encrypted traffic 394. In step 396 the decryption engine (DE) of the LISE 120 attempts to decrypt the received intercepted encrypted traffic using the decryption keys that it has available, and the decryption engine is successfully able to decrypt the encrypted traffic using the CDN1 key, which it received and stored in steps 294, 296. In step 400, the LISE 120 sends the decrypted traffic 402 to the MD 118. In step 404 the MD 118 receives the decrypted traffic, and in step 406 the MD 118 determines that the decrypted traffic corresponds to CDN1. In some embodiments, the determination that the decrypted traffic corresponds to CDN1 is based on the MD 118 evaluating the unencrypted traffic and recognizing an identifier corresponding to CDN1 132. In some other embodiments, the determination that the decrypted traffic corresponds to CDN1 is based information communicated to MD 118 from LISE 120 (e.g., along with the decrypted traffic), which indicates that the successfully decrypted traffic was decrypted using a key corresponding to CDN1 or a CDN1 key was used to sign the encrypted traffic. In step 408, the MD 118 makes an intercepted traffic handling decision based on the determination that the traffic corresponds to CDN1 and the previously received filtering request 270, which includes a rule: do not collect CDN1 traffic. Thus, in step 370 the MD 118 decides that the traffic is not to be sent to the LEMF 128, and the MD 118 discards the traffic since it corresponds to CDN1 132.

Figure 2D:
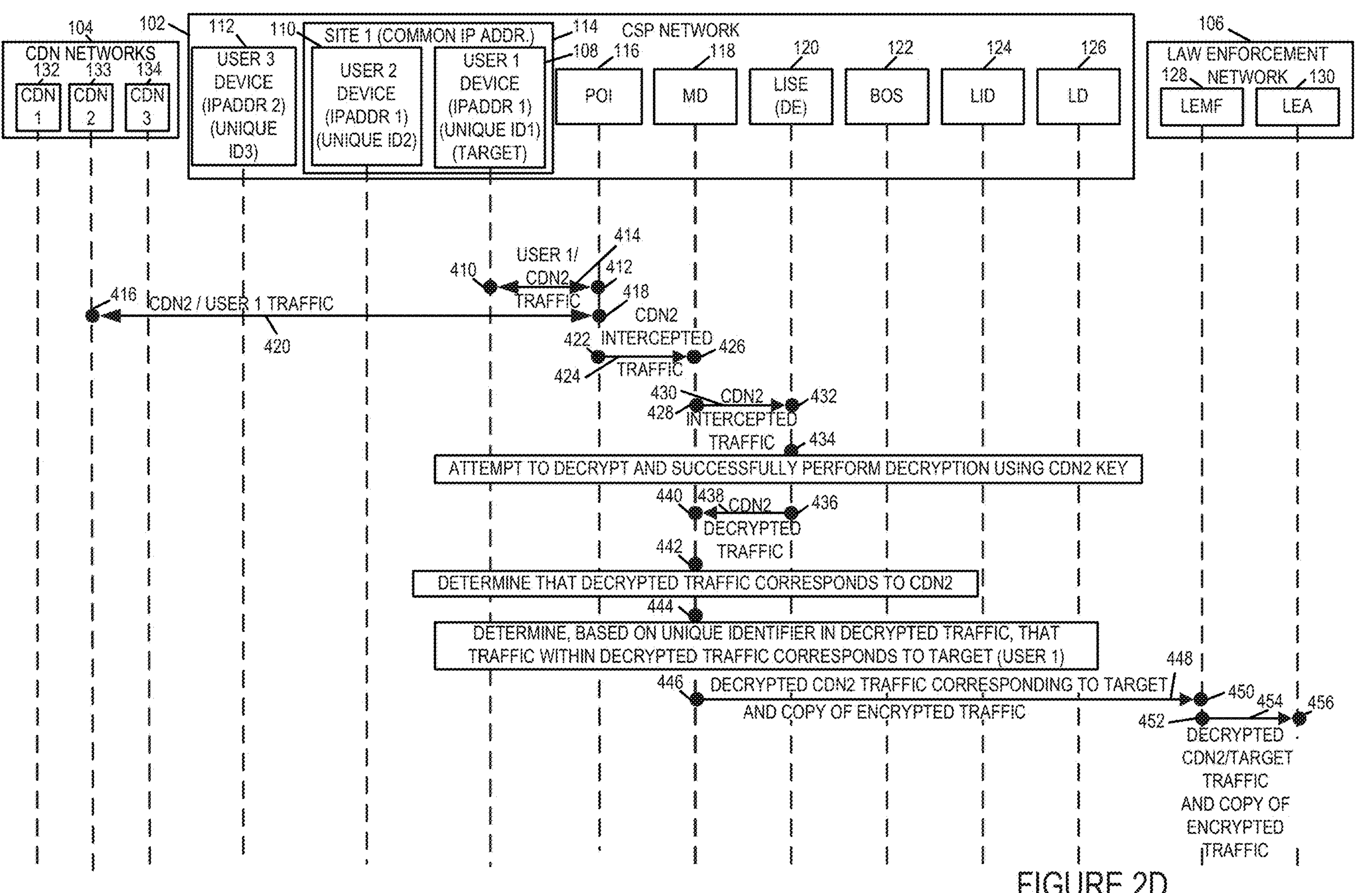
FIG. 2D is a drawing of a fourth part of an exemplary signaling diagram of an exemplary method of operating a communications system in accordance with an exemplary embodiment, said exemplary method including filtering of lawfully intercepted data corresponding to a target.

FIG. 2D, which illustrates an example of intercepted traffic corresponding to a second CDN network and the target being decrypted, filtered and forwarded to the LEMF, based on the filter request (received in step 310) and a unique identifier of the target included in the decrypted information, will now be described.

Traffic, e.g., bi-directional traffic, is being communicated between user 1 device 108 and CDN2 133, via POI device 116. In steps 410 and 412 user 1 device 108 and POI device 116 are operated to send and receive traffic signals 414. In steps 416 and 418 CDN2 133 and POI device 116 are operated to send and receive traffic signals 420. In step 422, POI device 116 intercepts encrypted traffic (414, 420), based on the received intercept request 244 (intercept all traffic thru POI based on source or destination IP address corresponding to the target), encapsulates the intercepted encrypted traffic, e.g., encapsulates intercepted IP packets in UDP packets, and sends the encapsulated intercepted encrypted traffic 424 to MD 118. In step 426 the MD 118 receives the encapsulated encrypted intercepted traffic. The intercepted traffic is encrypted, and the MD 118 is unaware, at this time, that the intercepted encrypted traffic corresponds to CDN2 133. In step 428, the MD 118 sends, e.g., forwards, the intercepted encrypted traffic, as signals 430, to the USE 120 for decryption. In step 432, the USE 120 receives the forwarded intercepted encrypted traffic. In step 434 the decryption engine (DE) of the LISE 120 attempts to decrypt the received encrypted traffic using the decryption keys that it has available, and the decryption engine is successfully able to decrypt the traffic using the CDN2 private key, which it received and stored in steps 332, 334. In step 436, the LISE 120 sends the decrypted traffic 438 to the MD 118. In step 440 the MD 118 receives the decrypted traffic, and in step 442 the MD 118 determines that the decrypted traffic corresponds to CDN2. In some embodiments, the determination that the decrypted traffic corresponds to CDN2 is based on the MD 118 evaluating the unencrypted traffic (received decrypted traffic) and recognizing an identifier corresponding to CDN2 133. In some embodiments, the determination that the decrypted traffic corresponds to CDN2 is based information communicated to MD 118 from LISE 120 (e.g., along with the decrypted traffic), which indicates that the successfully decrypted traffic was decrypted using a key corresponding to CDN2 or that the encrypted traffic was signed using a CDN2 key. In step 444, the MD 118 determines, based on a unique identifier in the decrypted traffic, corresponding to user 1, that the traffic corresponds to the target (user 1). In step 446 the MD 118 makes an intercepted encrypted traffic handling decision based on the filtering rule received in filter request 308. In step 446, based on the filter request 308 (which includes rule: send back CDN2 traffic corresponding to the target (user 1)) and the determinations that the traffic corresponds to both CDN2 and the target device (User 1), MD 118 decides to send the intercepted traffic to the LEMF 128, generates and sends signals 448 including the intercepted decrypted CDN2 traffic corresponding to the target and a copy of the original intercepted encrypted traffic to the LEMF 128. Both the decrypted and intercepted encrypted traffic is sent back to the LEMF 128 to maintain a chain of custody. In step 450 the LEMF 128 receives the decrypted CDN2 traffic corresponding to the target and a copy of the original intercepted encrypted traffic. In step 452 the LEMF 128 forwards the received decrypted CDN2 traffic corresponding to the target and a copy of the original intercepted encrypted traffic, as signals 454 to the LEA 130, which receives and recovers signals 454 in step 456.

Figure 2E:
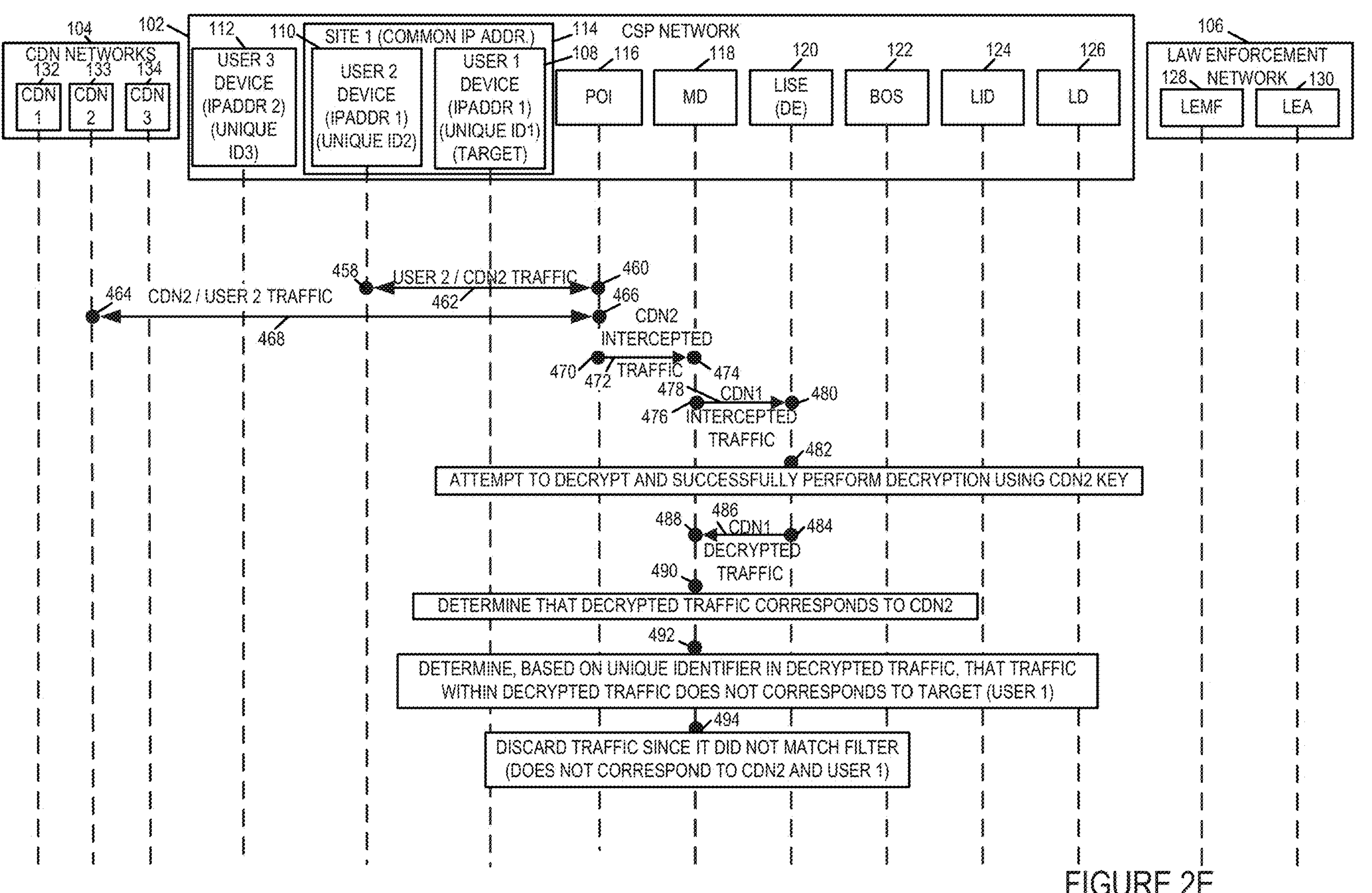
FIG. 2E is a drawing of a fifth part of an exemplary signaling diagram of an exemplary method of operating a communications system in accordance with an exemplary embodiment, said exemplary method including filtering of lawfully intercepted data corresponding to a target.

FIG. 2E, which illustrates an example of intercepted encrypted traffic corresponding to the second CDN network and a device which is not the target, but which has the same IP address as the target, being decrypted, filtered, and discarded, based on the filter request (received in step 310) and a unique identifier of the device, which is not the target, included in the decrypted information, will now be described.

Traffic, e.g., bi-directional traffic, is being communicated between user 2 device 110 and CDN2 133, via POI device 116. In steps 458 and 460 user 2 device 110 and POI device 116 are operated to send and receive traffic signals 462. In steps 464 and 466 CDN2 133 and POI device 116 are operated to send and receive traffic signals 468. In step 470, POI device 116 intercepts traffic (462, 468), based on the received intercept request 244 (intercept all traffic thru POI based on source or destination IP address corresponding to the target (note: user device 2 110 has the same IP address as target user device 1 108)), encapsulates the intercepted encrypted traffic, e.g., encapsulates intercepted IP packets in UDP packets, and sends the encapsulated intercepted encrypted traffic in signals 472 to MD 118, which the receives the intercepted encrypted traffic in step 474. The received intercepted traffic is encrypted, and the MD 118 is unaware, at this time, that the intercepted encrypted traffic corresponds to CDN2 133. In step 476, the MD 118 sends, e.g., forwards, the intercepted encrypted traffic, as signals 478, to the LISE 120 for decryption. In step 480, the LISE 120 receives the forwarded intercepted encrypted traffic 478. In step 482 the decryption engine (DE) of the LISE 120 attempts to decrypt the received intercepted encrypted traffic using the decryption keys that it has available, and the decryption engine is successfully able to decrypt the traffic using the CDN2 key, which it received and stored in steps 332, 334. In step 484, the LISE 120 sends the decrypted traffic 486 to the MD 118. In step 488 the MD 118 receives the decrypted traffic, and in step 490 the MD 118 determines that the decrypted traffic corresponds to CDN2. In some embodiments, the determination that the decrypted traffic corresponds to CDN2 is based on the MD 118 evaluating the unencrypted traffic and recognizing an identifier corresponding to CDN2 133. In some other embodiments, the determination that the decrypted traffic corresponds to CDN2 is based information communicated to MD 118 from LISE 120 (e.g., along with the decrypted traffic), which indicates that the successfully decrypted traffic was decrypted using a key corresponding to CDN2 or that a CDN2 key was used to sign the intercepted encrypted traffic. In step 492 the MD 118 determines, based on a unique identifier in the decrypted traffic, that the traffic does not correspond to the target (user 1), but rather corresponds to a different user (e.g., user 2, which has the same IP address as user 1). In step 494 the MD 118 makes an intercepted traffic handing decision based on the received filtering rule corresponding to the CDN2 (only send back intercepted CDN2 traffic with the target device (user device 1), the determination that the traffic is CDN2 traffic, and the determination that the traffic does not correspond to the target device. In step 494, the MD 118 decides to discard the traffic and does discard the traffic, since the traffic does not match the filter requirements for sending back intercepted traffic based on filter request 308 (rule: only send back intercepted CDN2 traffic with the target device (user device 1)).

Figure 2F:
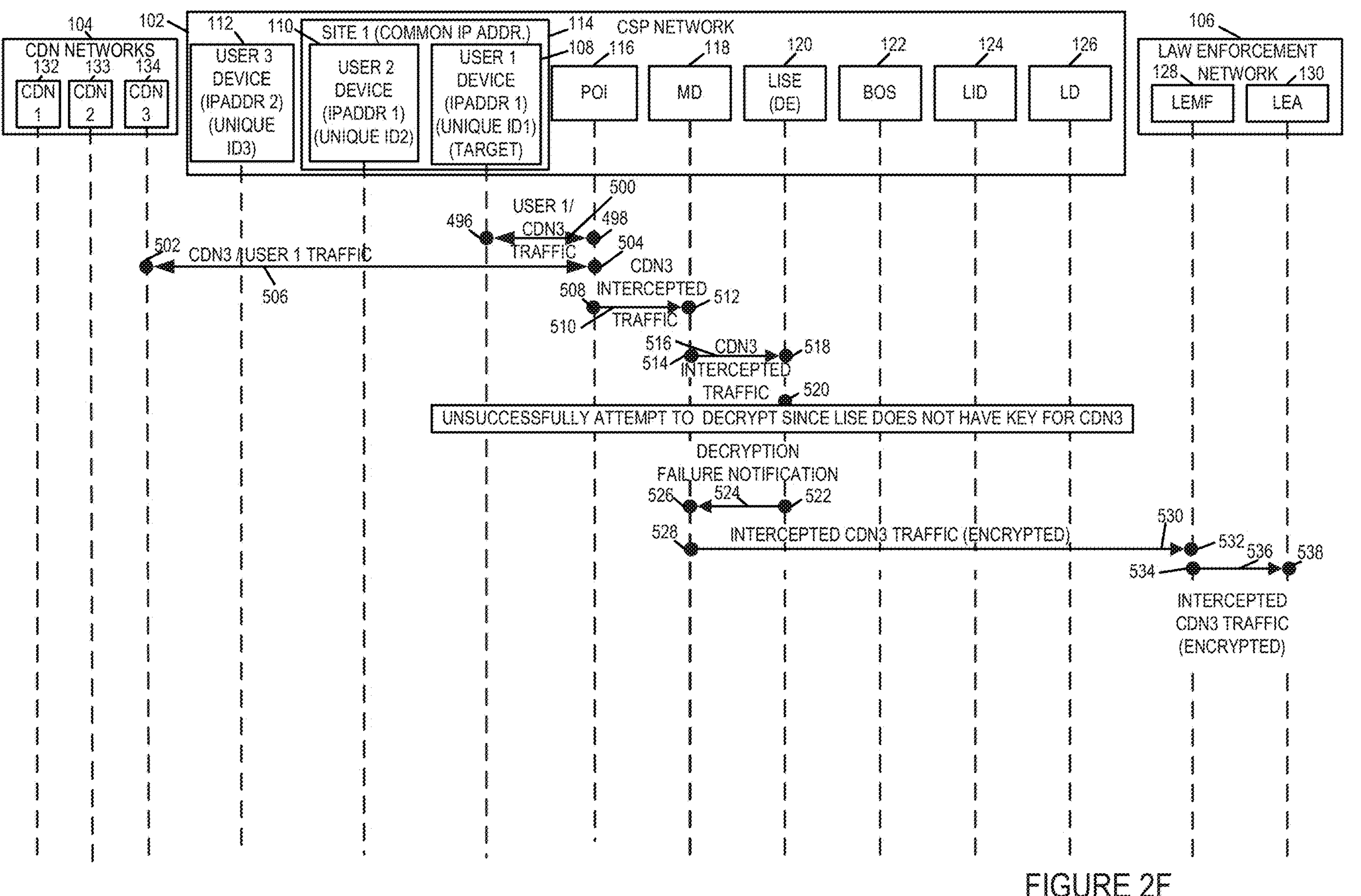
FIG. 2F is a drawing of a sixth part of an exemplary signaling diagram of an exemplary method of operating a communications system in accordance with an exemplary embodiment, said exemplary method including filtering of lawfully intercepted data corresponding to a target.

FIG. 2F, which illustrates an example of intercepted traffic corresponding to a third CDN network and the target, being forwarded as unencrypted traffic to the LEMF for evaluation since decryption was not possible by the LISE, will now be described.

Traffic, e.g., bi-directional traffic, is being communicated between user 1 device 108 and CDN3 134, via POI device 116. In steps 496 and 498 user 1 device 108 and POI device 116 are operated to send and receive traffic signals 500. In steps 502 and 504 CDN3 134 and POI device 116 are operated to send and receive traffic signals 506. In step 508, POI device 116 intercepts traffic (500, 506), based on the received intercept request 244 (intercept all traffic thru POI based on source or destination IP address corresponding to the target), encapsulates the intercepted encrypted traffic, e.g., encapsulates intercepted IP packets in UDP packets, and sends the encapsulated intercepted encrypted traffic 510 to MD 118. In step 512 the MD 118 receives the encapsulated intercepted encrypted traffic. The intercepted traffic is encrypted, and the MD 118 is unaware, at this time, that the intercepted encrypted traffic corresponds to CDN3 134. In step 514, the MD 118 sends, e.g., forwards, the intercepted encrypted traffic, as signals 516, to the USE 120 for decryption. In step 518, the USE 120 receives the forwarded intercepted encrypted traffic. In step 520 the decryption engine (DE) of the USE 120 attempts to decrypt the received intercepted encrypted traffic using the decryption keys that it has available (a CDN1 private key and a CDN2 private key); however, the decryption engine of the USE 120 is unable to decrypt the received encrypted traffic since the private key for CDN3 134 is not available to the decryption engine. In step 522, the USE 120 sends a decryption failure notification message 524 to the MD 118. In step 526 the MD 118 receives the decryption failure notification message. In step 528 the MD 118 sends the intercepted CDN3 traffic (in encrypted form) as signals 530 to the LEMF 128. In step 532 the LEMF 128 receives the intercepted CDN3 traffic (in encrypted form). In step 534 the LEMF 128 forwards the received the CDN3 traffic (in encrypted form), as signals 536 to the LEA 130, which receives and recovers signals 536 in step 538.

Figure 2G:
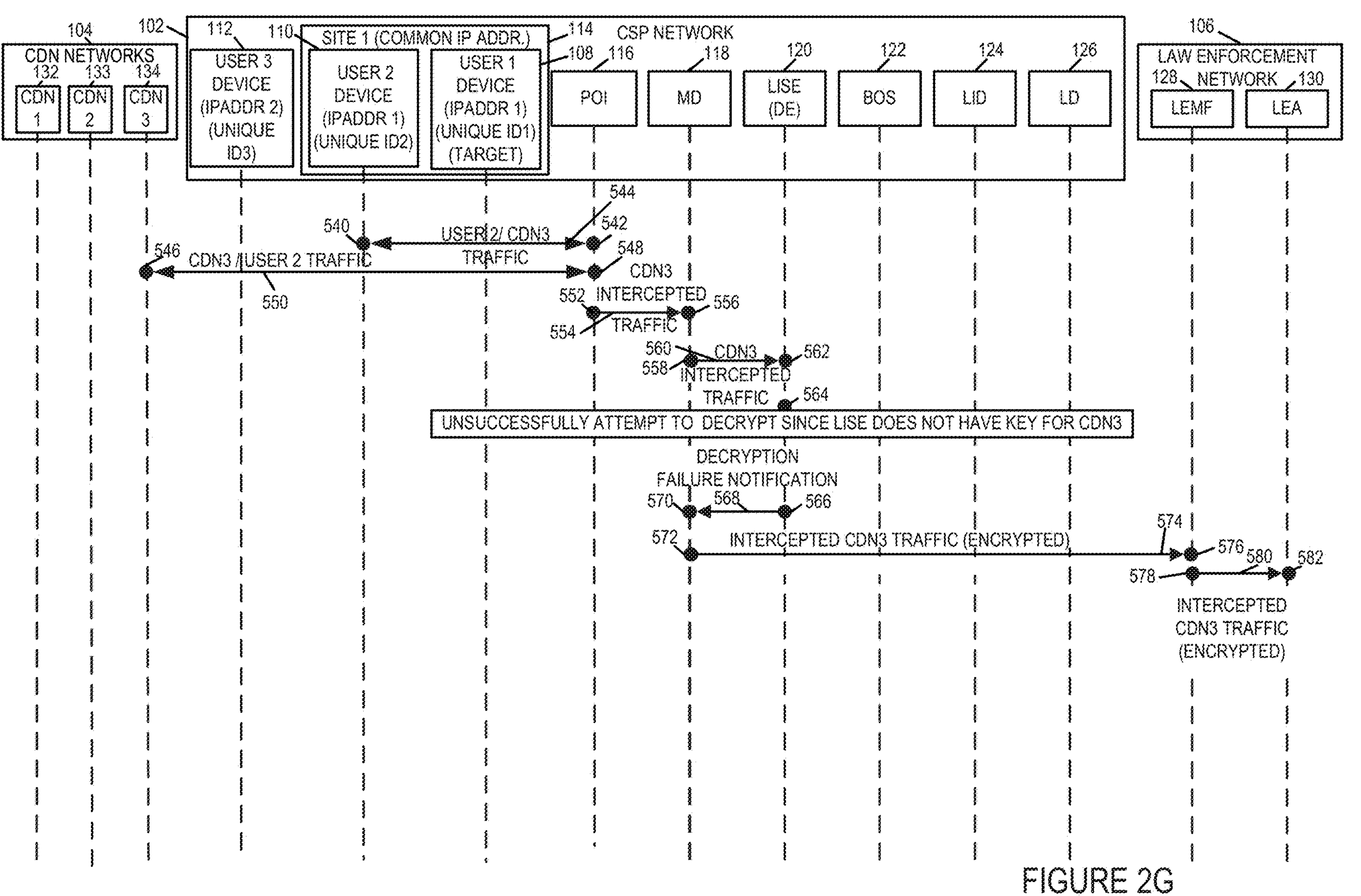
FIG. 2G is a drawing of a seventh part of an exemplary signaling diagram of an exemplary method of operating a communications system in accordance with an exemplary embodiment, said exemplary method including filtering of lawfully intercepted data corresponding to a target.

FIG. 2G, which illustrates an example of intercepted traffic corresponding to the third CDN network and a device which is not the target but which has the same IP address as the target, being forwarded as unencrypted traffic to the LEMF for evaluation since decryption was not possible by the LISE, will now be described.

Traffic, e.g., bi-directional traffic, is being communicated between user 2 device 110 and CDN3 134, via POI device 116. In steps 540 and 542 user 2 device 110 and POI device 116 are operated to send and receive traffic signals 544. In steps 546 and 548 CDN3 134 and POI device 116 are operated to send and receive traffic signals 506. In step 552, POI device 116 intercepts traffic (544, 550), based on the received intercept request 244 (intercept all traffic thru POI based on source or destination IP address corresponding to the target), encapsulates the intercepted traffic, e.g., encapsulates intercepted IP packets in UDP packets, and sends the encapsulated intercepted traffic 554 to MD 118. In step 556 the MD 118 receives the encapsulated intercepted traffic. The intercepted traffic is encrypted, and the MD 118 is unaware, at this time, that the intercepted traffic corresponds to CDN3 134. In step 556, the MD 118 sends, e.g., forwards, the intercepted traffic, as signals 560, to the USE 120 for decryption. In step 562, the USE 120 receives the forwarded intercepted traffic. In step 564 the decryption engine (DE) of the USE 120 attempts to decrypt the received encrypted traffic using the decryption keys that it has available (a CDN1 private key and a CDN2 private key); however, the decryption engine of the USE 120 is unable to decrypt the received encrypted traffic since the key for CDN3 134 is not available to the decryption engine. In step 566, the USE 120 sends a decryption failure notification message 568 to the MD 118. In step 570 the MD 118 receives the decryption failure notification message. In step 572 the MD 118 sends the intercepted CDN3 traffic (in encrypted form) as signals 574 to the LEMF 128. In step 576 the LEMF 128 receives the intercepted CDN3 traffic (in encrypted form). In step 558 the LEMF 128 forwards the received the CDN3 traffic (in encrypted form), as signals 580 to the LEA 130, which receives and recovers signals 580 in step 582.

Figure 2H:
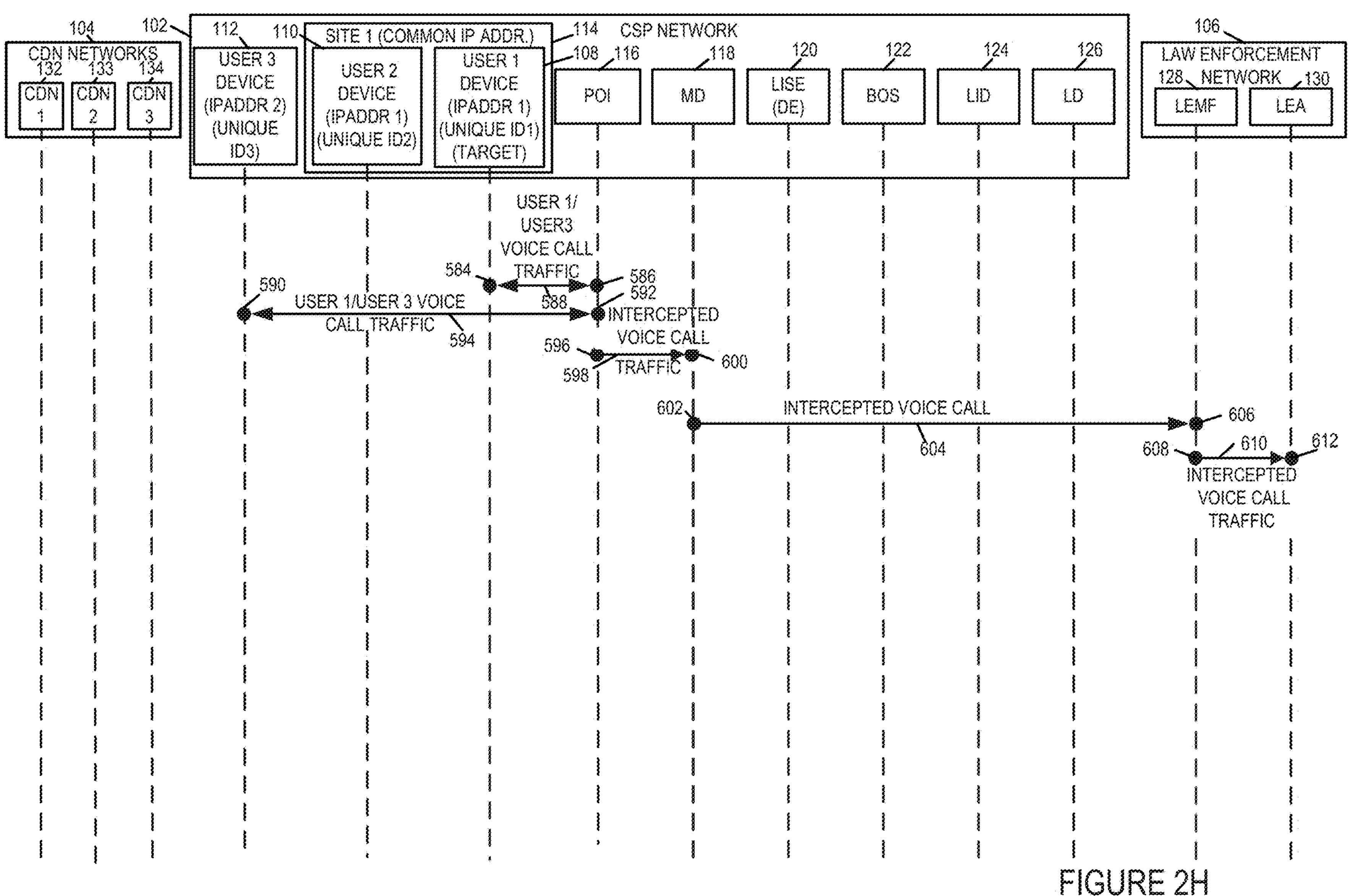
FIG. 2H is a drawing of an eighth part of an exemplary signaling diagram of an exemplary method of operating a communications system in accordance with an exemplary embodiment, said exemplary method including filtering of lawfully intercepted data corresponding to a target.

FIG. 2H, which illustrates an example of intercepted traffic corresponding to a voice call between the target and another device, being forwarded as to the LEMF for evaluation, will now be described.

Voice call traffic, e.g., bi-directional voice call traffic, is being communicated between user 1 device 108 and user device 3 112, via POI device 116. In steps 584 and 586 user 1 device 108 and POI device 116 are operated to send and receive traffic signals 588. In steps 590 and 592 user 3 device 112 and POI device 116 are operated to send and receive traffic signals 594. In step 592, POI device 116 intercepts traffic (588, 594), based on the received intercept request 244 (intercept all traffic thru POI based on source or destination IP address corresponding to the target), encapsulates the intercepted traffic, e.g., encapsulates intercepted IP packets in UDP packets, and sends the encapsulated intercepted traffic 598 to MD 118. In step 600 the MD 118 receives the encapsulated intercepted traffic. In step 602 the MD 118 sends the intercepted voice call traffic as signals 604 to the LEMF 128. In step 606 the LEMF 128 receives the intercepted voice call traffic. In step 608 the LEMF 128 forwards the received the voice call traffic, as signals 610 to the LEA 130, which receives and recovers signals 610 in step 612.

Figure 3:
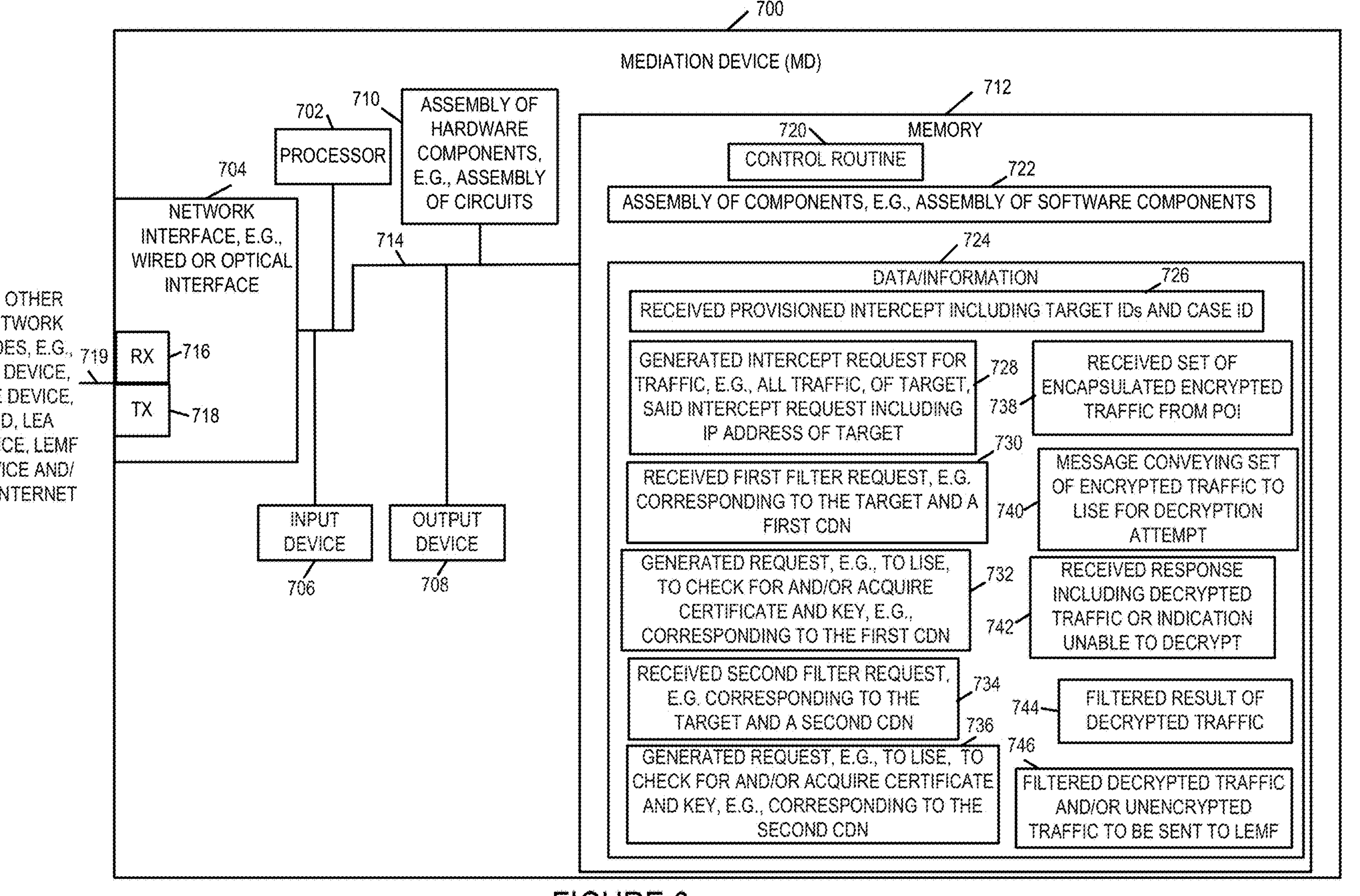
FIG. 3 is a drawing of an exemplary mediation device (MD) in accordance with an exemplary embodiment.

FIG. 3 is a drawing of an exemplary mediation device (MD), e.g., a lawful interception mediation device, 700 in accordance with an exemplary embodiment. Exemplary mediation device 700 is, e.g., mediation device 118 of system 100 of FIG. 1, mediation device 118 implementing steps of the method shown in the signaling diagrams of FIG. 2 and/or a mediation device implementing steps of the method of flowchart 900 of FIG. 5. Exemplary mediation device 700 includes a processor 702, e.g., a CPU, a network interface 704, e.g., a wired or optical interface, an input device 706, e.g., a keyboard, an output device 708, e.g., a display, an assembly of hardware components 710, e.g., an assembly of circuits, and memory 712 coupled together via a bus 714 over which the various elements may interchange data and information.

Network interface 704 includes a receiver 716 and a transmitter 718, coupled to connector 719, via which the mediation device 700 may receive and send signals to other network nodes, e.g. a point of interception (POI) device, a lawful interception security engine (LISE), a lawful intercept device (LID), a law enforcement agency (LEA) device, e.g., a terminal used by a law enforcement agent, a law enforcement management facility (LEMF) device, and/or the Internet.

Memory 712 includes a control routine 720, an assembly of components 722, e.g., an assembly of software components, and data/information 724. The control routine 720 includes code, which when executed by processor 702, causes the processor to control basic MD functions, e.g., read/write memory, control the interface, control the I/O devices, etc. The assembly of software components, e.g., routines, subroutines, software modules, applications, etc., include code, which when executed by processor 702, control the MD 700 to perform steps of a method, e.g., steps of the method of signaling diagram 200 of FIG. 2 and/or steps of the method of flowchart 900 of FIG. 5.

Data/information 724 includes a received provisioned intercept 726 including target IDs and a case number, a generated intercept request for traffic, e.g. all traffic, of a target 728, said intercept request including an IP address of the target, a received first filter request 730, e.g., corresponding to the target and a first CDN, a generated request 732, e.g., to be sent to the LISE, to check for and/or acquire a certificate and key, e.g. corresponding to the first CDN, a received second filter request 734, e.g., corresponding to the target and a second CDN, and a generated request 736, e.g., to be sent to the LISE, to check for and/or acquire a certificate and key, e.g. corresponding to the second CDN. Data/information 724 further includes a received set of encapsulated encrypted traffic from the POI 738, a generated message conveying a set of encrypted traffic to LISE for a decryption attempt 740, a received response including decrypted traffic or an indication that the LISE was unable to decrypt 742, a filtered result of the decrypted traffic 744 and filtered decrypted traffic and/or unencrypted traffic to be sent to the LEMF.

Figure 4:
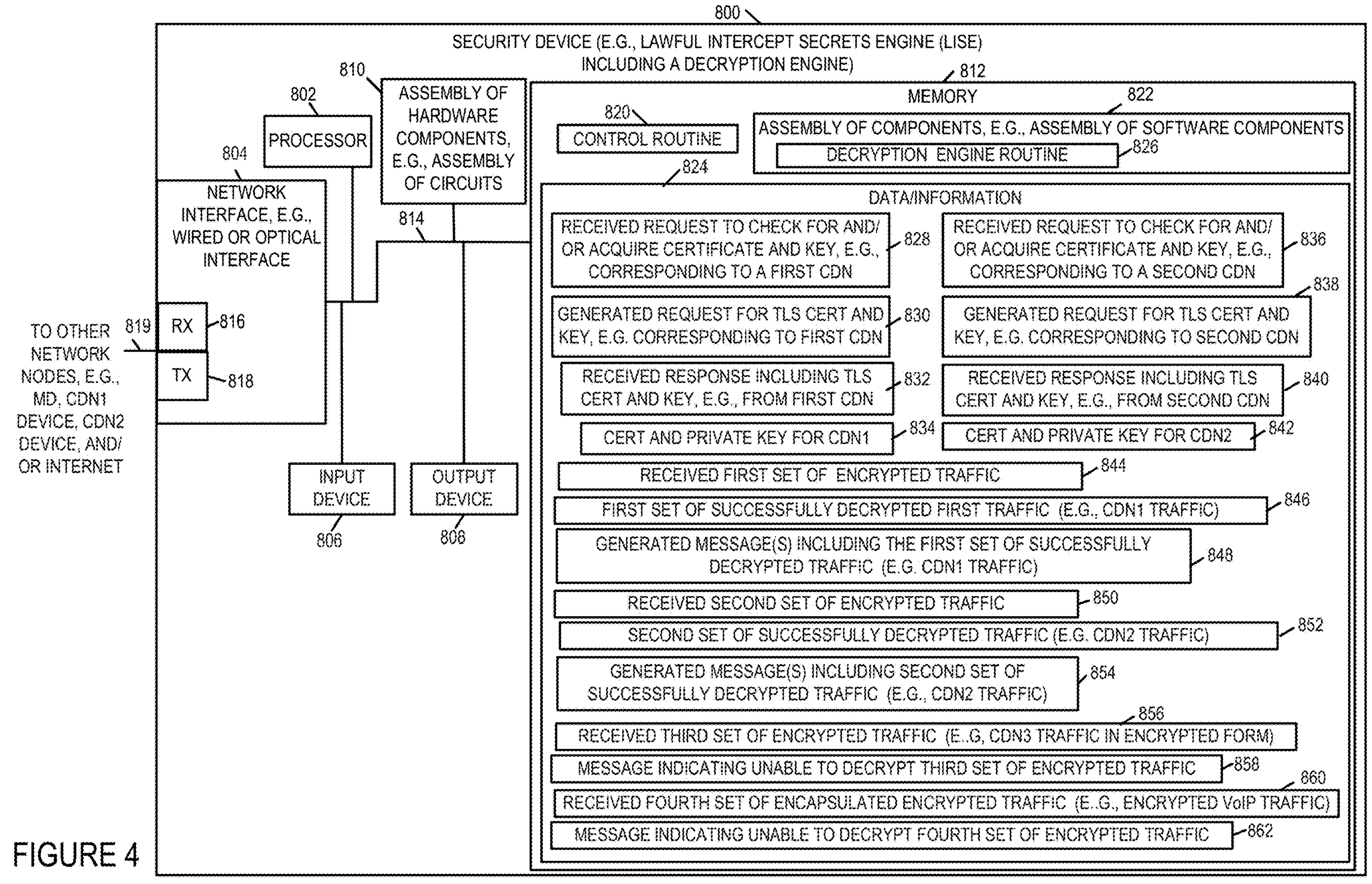
FIG. 4 is a drawing of an exemplary security device, e.g., a lawful intercept secrets engine (LISE) including a decryption engine (DE), in accordance with an exemplary embodiment.
Figure 5A:
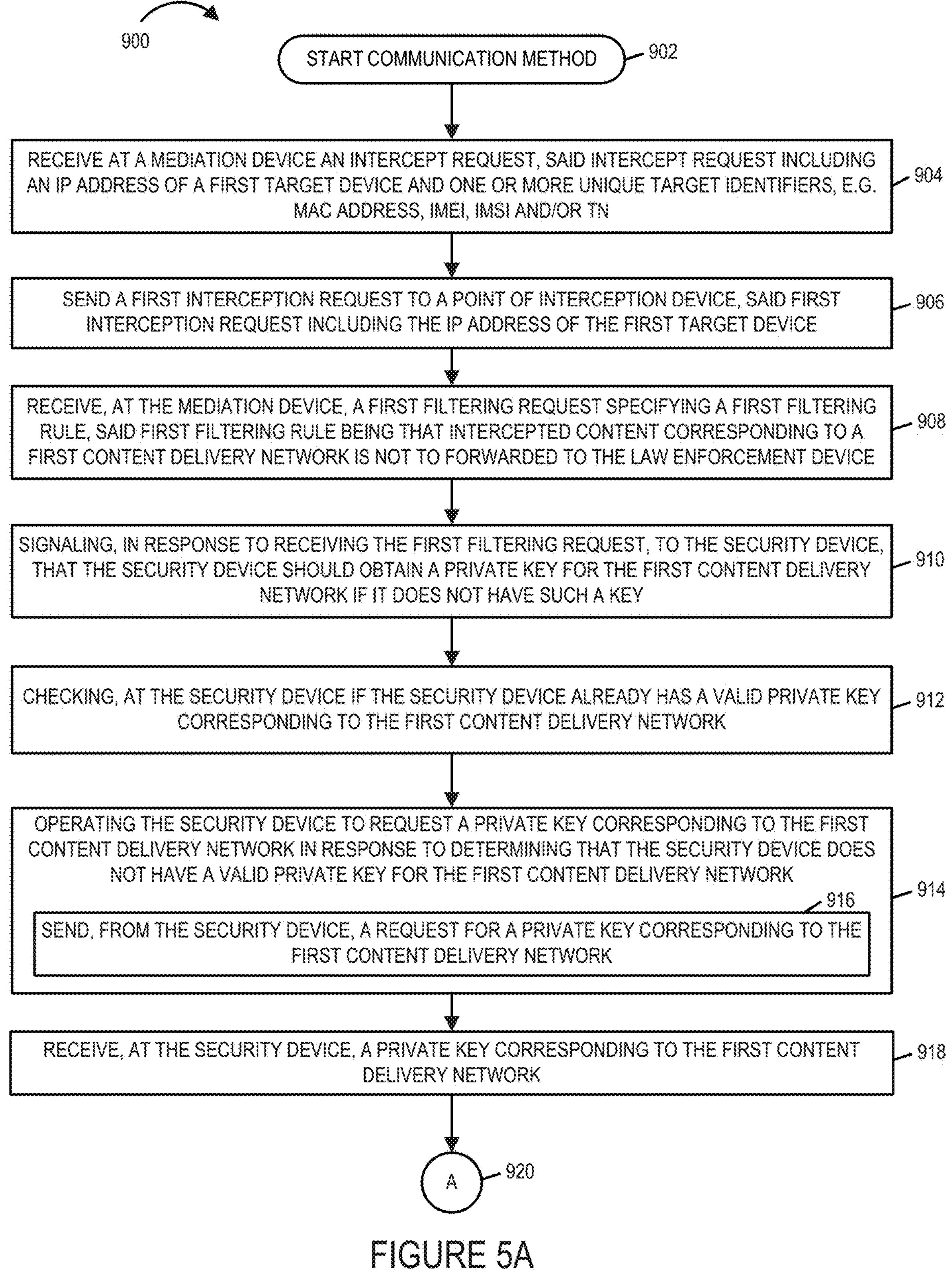
FIG. 5A is a first part of a flowchart of an exemplary communications method in accordance with an exemplary embodiment, said exemplary method included filtering of lawfully intercepted data corresponding to a target.
Figure 5C:
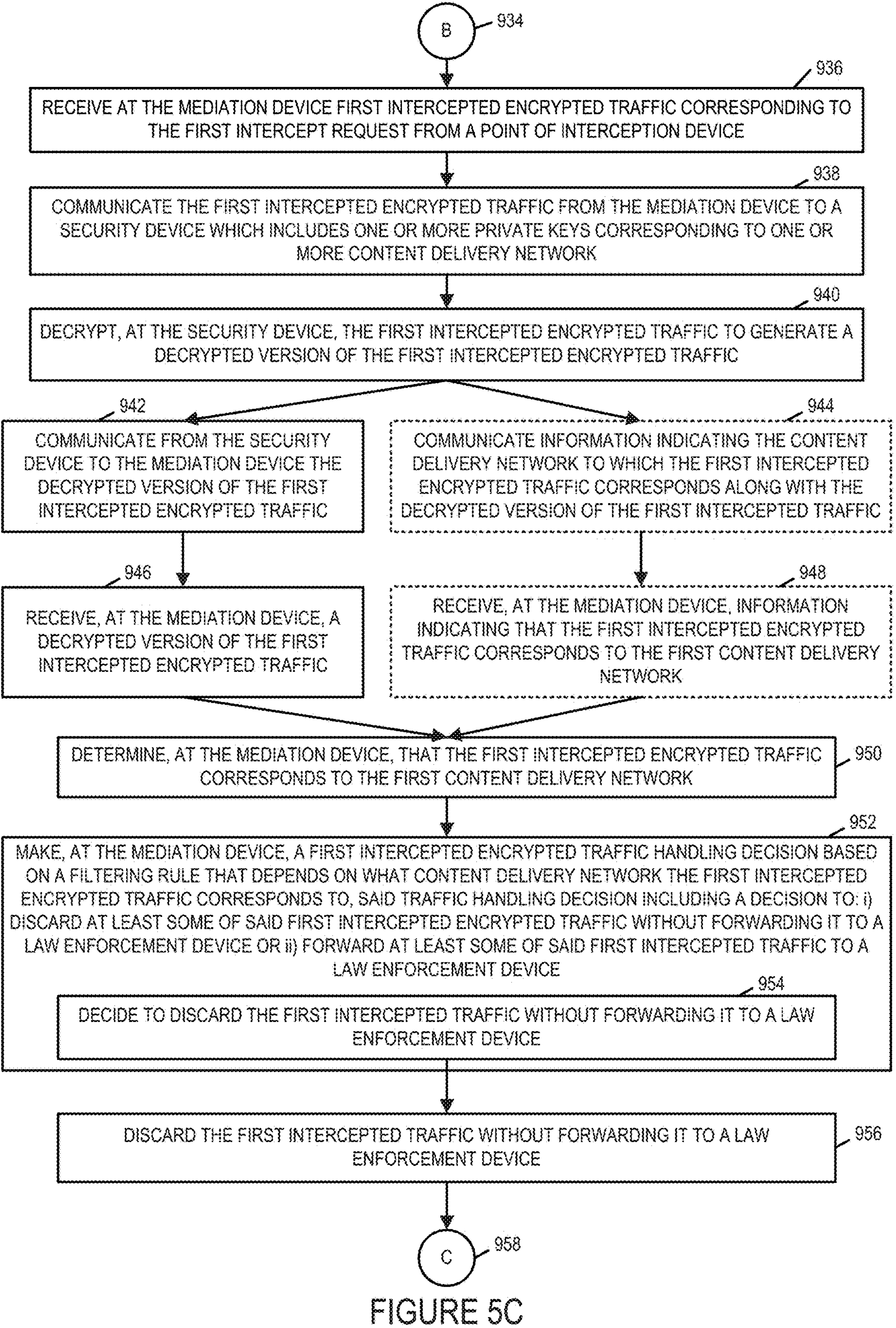
FIG. 5C is a third part of a flowchart of an exemplary communications method in accordance with an exemplary embodiment, said exemplary method included filtering of lawfully intercepted data corresponding to a target.
Figure 5D:
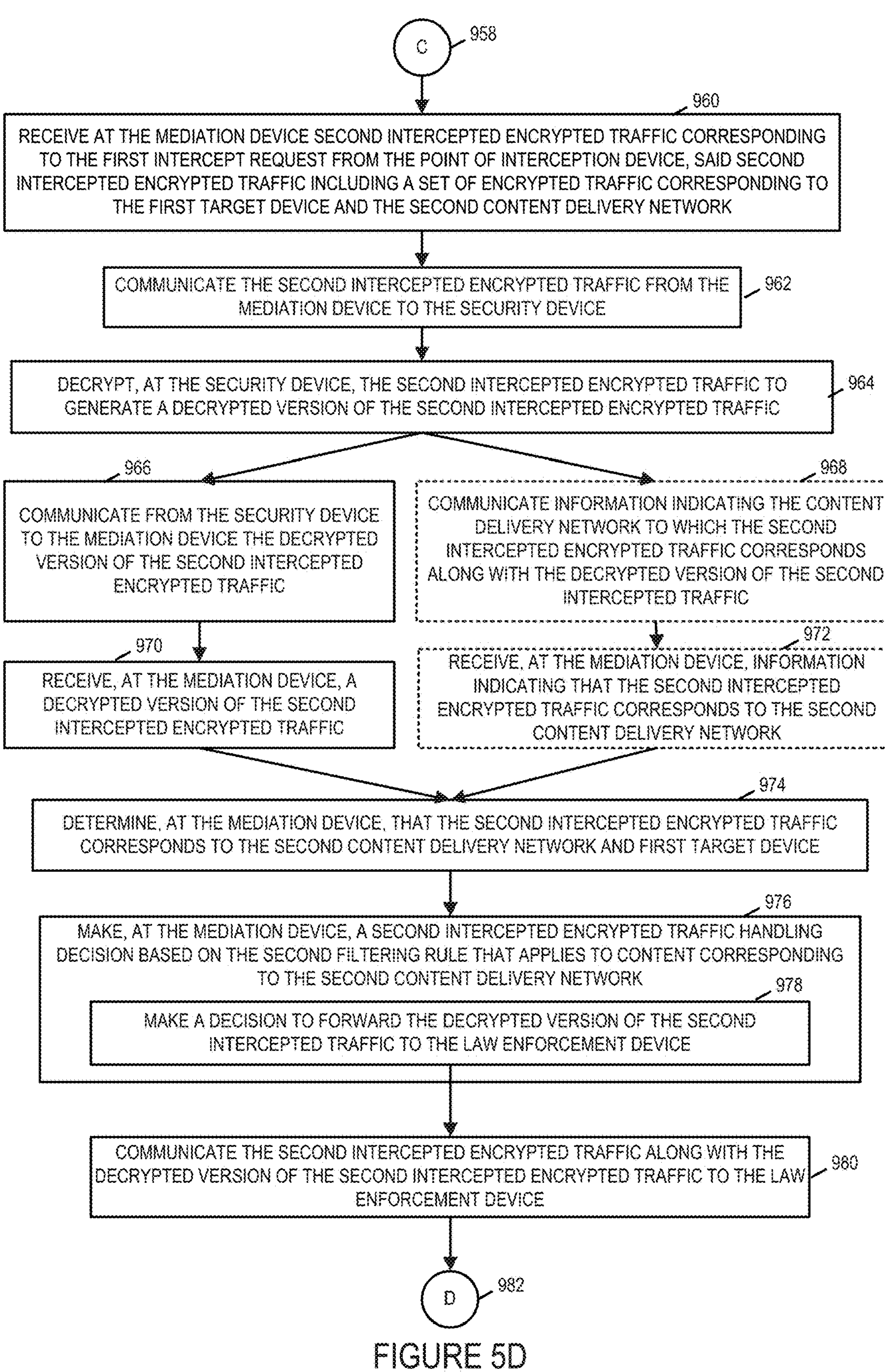
FIG. 5D is a fourth part of a flowchart of an exemplary communications method in accordance with an exemplary embodiment, said exemplary method included filtering of lawfully intercepted data corresponding to a target.
Figure 5E:
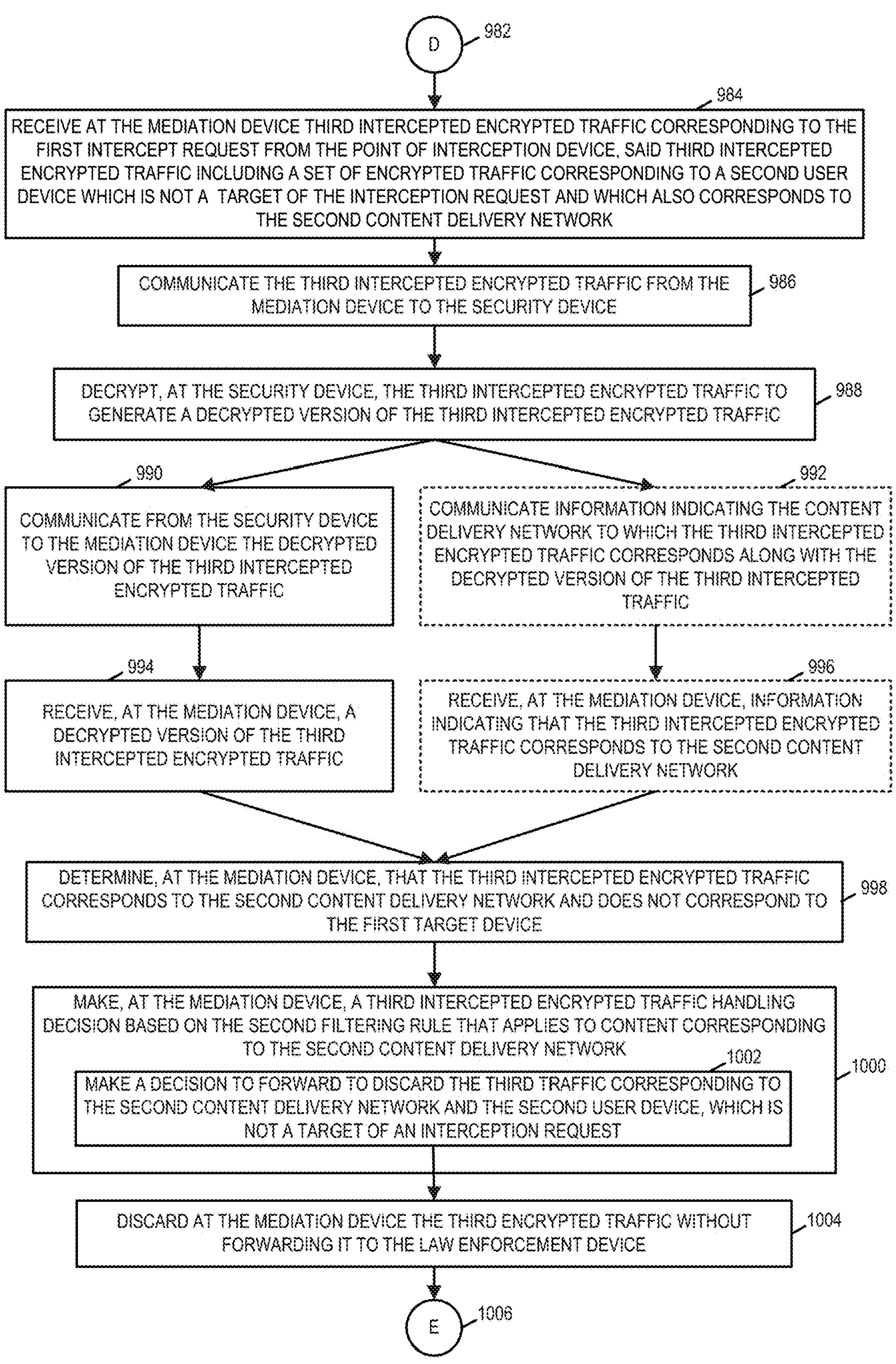
FIG. 5E is a fifth part of a flowchart of an exemplary communications method in accordance with an exemplary embodiment, said exemplary method included filtering of lawfully intercepted data corresponding to a target.
Figure 5F:
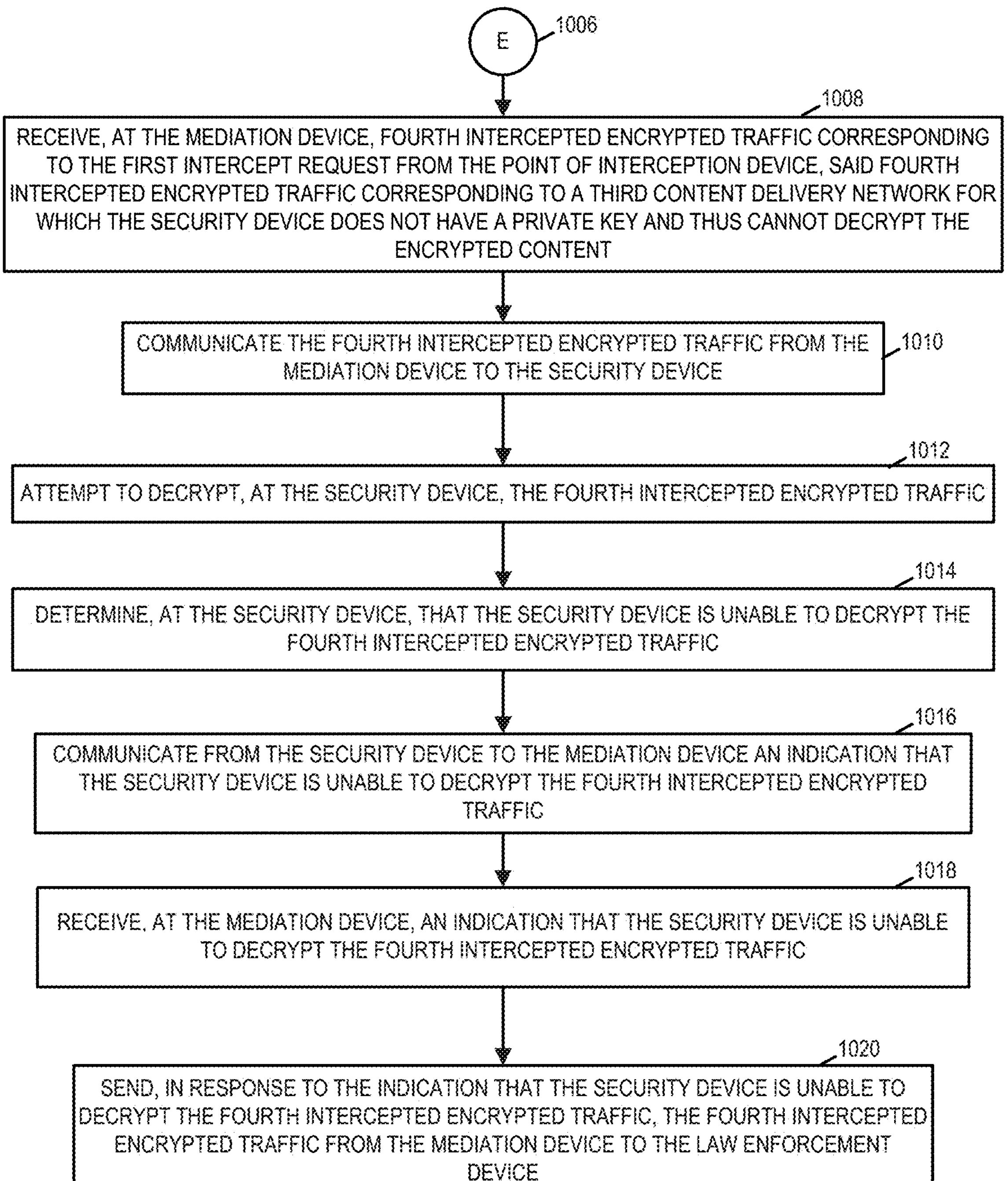
FIG. 5F is a sixth part of a flowchart of an exemplary communications method in accordance with an exemplary embodiment, said exemplary method included filtering of lawfully intercepted data corresponding to a target.

FIG. 4 is a drawing of an exemplary security device 800, e.g., a lawful intercept secrets engine (LISE) including a decryption engine (DE), in accordance with an exemplary embodiment. Exemplary security device 800 is, e.g., LISE 120 of system 100 of FIG. 1, LISE 120 implementing steps of the method shown in the signaling diagrams of FIG. 2 and/or the security device implementing steps of the method of flowchart 900 of FIG. 5. Exemplary security device 800 includes a processor 802, e.g., a CPU, a network interface 804, e.g., a wired or optical interface, an input device 806, e.g., a keyboard, an output device 808, e.g., a display, an assembly of hardware components 810, e.g., an assembly of circuits, and memory 812 coupled together via a bus 814 over which the various elements may interchange data and information.

Network interface 804 includes a receiver 816 and a transmitter 818, coupled to connector 819, via which the security device 800 may receive and send signals to other network nodes, e.g., a mediation device, a CDN1 device such as a key server 170 for CDN1, a CDN2 device such as a key server 174 for CDN2, and/or the Internet.

Memory 812 includes a control routine 820, an assembly of components 822, e.g., an assembly of software components, and data/information 824. Assembly of components 822 includes a decryption engine routine 826. The control routine 820 includes code, which when executed by processor 802, causes the processor 802 to control basic security device 800 functions, e.g., read/write memory, control the interface, control the I/O devices, etc. The assembly of software components 822, e.g., routines, subroutines, software modules, applications, etc., include code, which when executed by processor 702, control the MD 700 to perform steps of a method, e.g., steps of the method of signaling diagram 200 of FIG. 2 and/or steps of the method of flowchart 900 of FIG. 5.

Data/information 824 includes a received request 828 to check for and/or acquire a certificate and private key, e.g., corresponding to a first CDN, a generated request 830 for TLS certificate and private key, e.g., corresponding to the first CDN, a received response 832 including a TLS certificate and private key, e.g. from the first CDN, a stored certificate and private key 834 for CDN1, a received request 836 to check for and/or acquire a certificate and private key, e.g., corresponding to a second CDN, a generated request 838 for TLS certificate and private key, e.g., corresponding to the second CDN, a received response 840 including a TLS certificate and private key, e.g. from the second CDN, and a received first set of encrypted traffic 844, a first set of successfully decrypted traffic 846, e.g. corresponding to CDN1, a generated message including the first set of successfully decrypted traffic 848, e.g. corresponding to CDN1, a received second set of encrypted traffic 850, a second set of successfully decrypted traffic 852, e.g. corresponding to CDN2, a generated message including the second set of successfully decrypted traffic 854, e.g. corresponding to CDN2, a received third set of encrypted traffic 856, e.g., encrypted traffic corresponding to CDN3, a generated message 858 indicating that the security device was unable to decrypt the third set of encrypted traffic, a received fourth set of encrypted traffic 860, e.g., encrypted VoIP traffic, a generated message 862 indicating that the security device was unable to decrypt the fourth set of encrypted traffic.

FIG. 5, comprising the combination of FIG. 5A, FIG. 5B, FIG. 5C, FIG. 5D, FIG. 5E and FIG. 5F, is a flowchart 900 of an exemplary communications method in accordance with an exemplary embodiment, said exemplary communications method including filtering of lawfully intercepted data corresponding to a target. The exemplary communications method of FIG. 5 is performed by a mediation device and a security device, e.g., by mediation device (MD) 118 and lawful intercept security engine (LISE) 120 of communications service provider (CSP) network 102 of exemplary communications system 100 of FIG. 1, in accordance with an exemplary embodiment.

Operation of the exemplary method starts in step 902, in which the communications system is powered on and initialized. Operation proceeds from step 902 to step 904. In step 904 the mediation device (MD), e.g., MD 118, receives an intercept request, said intercept request including an IP address of a first target and one or more unique target identifiers corresponding to the first target, e.g., a MAC address, an IMEI, an IMSI, and/or TN. Operation proceeds from step 904 to step 906. In step 906 the mediation device 118 sends a first interception request to a point of interception (POI) device, e.g., POI device 116, said first intercept request including the IP address of the first target device. In various embodiments, the first intercept request sent to the POI device 116 does not included the received one or more unique target identifiers. The one or more unique target identifiers are stored in the mediation device 118 for future use in making intercepted traffic handling decisions, e.g., filtering decisions at the mediation device 118 with regard to which intercepted traffic should be sent to a law enforcement device and which intercepted traffic should be discarded. Operation proceeds from step 906 to step 908.

In step 908 the mediation device 118 receives a first filtering request specifying a first filtering rule, said first filtering rule being that intercepted content corresponding to a first content delivery network, e.g., CDN1 132, is not to be forwarded to a law enforcement device, e.g., law enforcement management facility (LEMF) device 128 or law enforcement agency (LEA) device 130. In some embodiments, the first filtering rule indicates that intercepted traffic corresponding to, e.g., was obtained from or originating from, a first content delivery network, e.g., CDN1 132, should not be forwarded to the law enforcement device, e.g., LEMF device 128 or LEA device 130. For example, in some embodiments, the first rule indicates that information from CDN1 132, which is a movie or other pre-recorded content delivery provider such as Netflix, should not be forwarded as part of the intercept request and thus should be discarded by the mediation device 118. Operation proceeds from step 908 to step 910.

In step 910 the mediation device 118 signals, in response to receiving the first filtering request, to the security device 120, that the security device 120 should obtain a private key for the first content delivery network, e.g., CDN1 132, if it does not have such a key. In step 910, the security device 120 checks, at the security device 120, if the security device 120 already has a valid private key corresponding to the first content delivery network, e.g., CDN1 132. Operation proceeds from step 912 to step 914.

In step 914 the security device 120 is operated to request, e.g., via a secure communications link, a private key corresponding to the first content delivery network, in response to determining that the security device 120 does not have a valid private key for the first content delivery network, e.g., CDN1 132. Step 914 includes step 916, in which the security device 120 sends a request for a private key to the first content delivery network, e.g., CDN1 132. In some embodiments, the request for the private key is sent as part of request for a TLS certificate and private key corresponding to the first content delivery network, e.g., CDN1 132, that is sent from the security device 120 to a first security key server, e.g., key server 170, included in CDN1 132. Operation proceeds from step 914 to step 918.

In step 918 the security device 120 receives a private key corresponding to the first content delivery network, e.g., CDN1 132. Operation proceeds from step 918, via connecting node A 920 to step 922.

In step 922 the mediation device 118 receives a second filtering request specifying a second filtering rule, said second filtering rule being that intercepted content corresponding to a second content delivery network, e.g. CDN2 133, and the first target device, e.g. user device 1 108, is to be forwarded a law enforcement device, e.g. law enforcement management facility (LEMF) device 128 or law enforcement agency (LEA) device 130, but that second content delivery network traffic, e.g., CDN2 133 traffic, corresponding to other user devices, e.g. user device 2 110, is not to be forwarded to the law enforcement device, e.g. because it is not of interest. Operation proceeds from step 922 to step 924.

In step 924 the mediation device 118 signals, in response to receiving the second filtering request, to the security device 120, that the security device should obtain a private key for the second content delivery network if it does not have such a key. In step 926, the security device 120 checks, at the security device, if the security device already has a private key corresponding to the second content delivery network, e.g., CDN2 133. Operation proceeds from step 926 to step 928.

In step 928 the security device 120 is operated to request a private key corresponding to the second content delivery network (CDN2 133), in response to determining that the security device does not have a valid private key for the second content delivery network (CDN2 133). Step 928 includes step 930, in which the security device 120 sends a request for a private key to the second content delivery network (CDN2 133). In some embodiments, the request for the private key is sent as part of request for a TLS certificate and private key corresponding to the second content delivery network, e.g., CDN2 133, that is sent from the security device 120 to a second security key server, e.g., key server 174, included in CDN2 133. Operation proceeds from step 928 to step 932.

In step 932 the security device 120 receives a private key corresponding to the second content delivery network. Operation proceeds from step 932, via connecting node B 934, to step 936.

In step 936 the mediation device 118 receives first intercepted encrypted traffic corresponding to the first intercept request from the point of interception (POI) device 116. Operation proceeds from step 936 to step 938.

In step 938 the mediation device 118 communicates the first intercepted encrypted traffic to the security device 120, which includes one or more private keys corresponding to one or more content delivery networks, e.g., CDN1 132 and/or CDN2 133. Operation proceeds from step 938 to step 940.

In step 940 the security device 120 decrypts the first intercepted encrypted traffic to generate a decrypted version of the first intercepted encrypted traffic. Operation proceeds from step 940 to step 942, and in some embodiments, to step 944.

In step 942 the security device 120 communicates the decrypted version of the first intercepted encrypted traffic to the mediation device 118. In some embodiments, the decrypted version of the first intercepted encrypted traffic includes an identifier indicating the content delivery network, e.g., CDN1 132, to which the first encrypted traffic corresponds. Operation proceeds from step 942 to step 946. In step 946 the mediation device 118 receives the decrypted version of the first intercepted encrypted traffic, e.g., returned by the security device. In some embodiments, information indicating the content delivery network to which the decrypted traffic corresponds is communicated within the decrypted traffic, e.g., as determined based on a CDN identifier. e.g., a CDN1 132 identifier, included in the decrypted traffic, and/or is communicated along with the decrypted traffic, e.g., as determined based on the private key of a CDN, e.g., CDN1 132, which was able to be used to decrypt and/or check the signature on the first intercepted encrypted traffic.

Returning to step 944, in step 944 the security device 120 communicates to the mediation device information indicating the content delivery network to which the first intercepted encrypted traffic corresponds along with the decrypted version of the first intercepted traffic. Operation proceeds from step 944 to step 948. In step 948 the mediation device 118 receives information indicating that the first intercepted encrypted traffic corresponds to the first content delivery network (CDN1 132). Operation proceeds from step 946 and/or step 948 to step 950.

In step 950 the mediation device 118 determines that the first intercepted encrypted traffic corresponds to the first content delivery network, e.g. CDN1 132, e.g. based on an indication from the security device 120, that the first intercepted content was signed using the private key for CDN1 132 or was decrypted by the private key of CDN1 132 as indicated in information supplied to the mediation device 118 with the decrypted content provided by the security device 120 or based on an indication, e.g. a CDN1 identifier, in the received decrypted traffic indicating that the traffic corresponds to CDN1. Operation proceeds from step 950 to step 952.

In step 952 the mediation device 118 makes a first intercepted encrypted traffic handling decision (e.g., a decision on how to handle the intercepted content based on a filtering rule) based on a filtering rule that depends on what content delivery network the first intercepted encrypted traffic corresponds to, said traffic handling decision including a decision to: i) discard at least some of the said first intercepted encrypted traffic without forwarding it to a law enforcement device, e.g., LEMF device 128 or LEA device 130, or ii) forward at least some of said first intercepted traffic to a law enforcement device, e.g., LEMF device 128 or LEA device 130. Step 952 includes step 954, in which the mediation device 118 decides to discard the first intercepted traffic without forwarding it to a law enforcement device, e.g., LEMF device 128 or LEA device 130. Operation proceeds from step 954 to step 956. In step 956 the mediation device 118 discards the first intercepted traffic without forwarding it to a law enforcement device. Operation proceeds from step 956, via connecting node C 958, to step 960.

In step 960 the mediation device 118 receives second intercepted encrypted traffic corresponding to the first intercept request from the point of interception (POI) device 116, said second intercepted encrypted traffic including a set of encrypted traffic corresponding to the first target device, e.g., user device 1 108, and the second content delivery network, e.g., CDN2 133. Operation proceeds from step 960 to step 992.

In step 962 the mediation device 118 communicates the second intercepted encrypted traffic to the security device 120. Operation proceeds from step 962 to step 964.

In step 964 the security device 120 decrypts the second intercepted encrypted traffic to generate a decrypted version of the second intercepted encrypted traffic. Operation proceeds from step 964 to step 966, and in some embodiments, to step 968.

In step 966 the security device 120 communicates the decrypted version of the second intercepted encrypted traffic to the mediation device 118. Operation proceeds from step 966 to step 970. In step 970 the mediation device 118 receives the decrypted version of the second intercepted encrypted traffic, e.g., returned by the security device 120. In some embodiments, information indicating the content delivery network, e.g., CDN2 133, to which the decrypted version of the second intercepted traffic corresponds is communicated within the decrypted traffic. In some embodiments, information indicating the content delivery network, e.g., CDN2 133, to which the decrypted version of the second intercepted traffic corresponds is communicated along with the decrypted traffic, e.g., as determined based on the private key of a CDN, e.g., CDN2 133, which was able to be used to decrypt and/or check the signature on second intercepted encrypted traffic.

Returning to step 968, in step 968 the security device 120 communicates to the mediation device 118 information indicating the content delivery network to which the second intercepted encrypted traffic corresponds along with the decrypted version of the second intercepted traffic. Operation proceeds from step 968 to step 972. In step 972 the mediation device 118 receives information indicating that the second intercepted encrypted traffic corresponds to the second content delivery network (CDN2 133). Operation proceeds from step 970 and/or step 972 to step 974.

In step 974 the mediation device 118 determines that the second intercepted encrypted traffic corresponds to the second content delivery network (CDN2 133) and the first target device (user device 1 108). Operation proceeds from step 974 to step 976.

In step 976 the mediation device 118 makes a second intercepted encrypted traffic handling decision (e.g., a decision in how to handle second intercepted encrypted content based on the second filtering rule) based on the second filtering rule that applies to content corresponding to the second content delivery network. Step 976 includes step 978, in which the mediation device 118 decides to forward the decrypted version of the second intercepted traffic to the law enforcement device, e.g., LEMF device 128 or LEA device 130, since the second set of intercepted encrypted traffic corresponds to the target user device, e.g., user 1 device 108, and the second CDN, e.g., CDN2 133. Operation proceeds from step 978 to step 980. In step 980 the mediation device 118 communicates the second intercepted encrypted traffic along with the decrypted version of the second intercepted encrypted traffic to the law enforcement device, e.g., LEMF device 128 or LEA device 130. Operation proceeds from step 990, via connecting node D 982, to step 984.

In step 984 the mediation device 118 receives third intercepted encrypted traffic corresponding to the first interception request from the point of interception (POI) device 116, said third intercepted encrypted traffic including a set of encrypted traffic corresponding to a second user device, e.g., user device 2 110, which is not a target of an interception request and which also corresponds to the second content delivery network, e.g., CDN2 133. Operation proceeds from step 984 to step 986.

In step 986 the mediation device 118 communicates the third intercepted encrypted traffic to the security device 120. Operation proceeds from step 986 to step 988.

In step 988 the security device 120 decrypts the third intercepted encrypted traffic to generate a decrypted version of the third intercepted encrypted traffic. Operation proceeds from step 988 to step 990, and in some embodiments, to step 992.

In step 990 the security device 120 communicates the decrypted version of the third intercepted encrypted traffic to the mediation device 118. Operation proceeds from step 990 to step 994. In step 994 the mediation device 118 receives the decrypted version of the third intercepted encrypted traffic, e.g., returned by the security device 120. In some embodiments, information indicating the content deliver network, e.g. CDN2 133, to which the decrypted version of the third intercepted encrypted traffic corresponds (e.g., based on the private key that was used to decrypt the traffic or used to check the signature) is communicated along with the decrypted version of the third intercepted encrypted traffic and/or an information, e.g. a CDN2 133 identifier, identifying the second content delivery network, e.g., CDN2 133, is communicated within the decrypted version of the third intercepted encrypted traffic.

Returning to step 992, in step 992 the security device 120 communicates to the mediation device 118 information indicating the content delivery network to which the third intercepted encrypted traffic corresponds along with the decrypted version of the third intercepted traffic. Operation proceeds from step 992 to step 994. In step 994 the mediation device 118 receives information indicating that the third intercepted encrypted traffic corresponds to the second content delivery network (CDN2 133). Operation proceeds from step 994 and/or step 996 to step 998.

In step 998 the mediation device 118 determines that the third intercepted encrypted traffic corresponds to the second content delivery network (CDN2 133) and does not correspond to the first target device (user device 1 108). Operation proceeds from step 998 to step 1000.

In step 1000 the mediation device 118 makes a third intercepted encrypted traffic handling decision (e.g., a decision on how to handle third intercepted encrypted content based on the second filtering rule) based on the second filtering rule that applies to content corresponding to the second content delivery network, e.g., CDN2 133. Step 1000 includes step 1002, in which the mediation device 118 decides to discard the third traffic corresponding to the second content delivery network, e.g., CDN2 133, and the second user device, e.g., user device 2 100, which is not a target of the interception request. Operation proceeds from step 1002 to step 1004. In step 1004 the mediation device 118 discards the third encrypted traffic, e.g., without forwarding it to the law enforcement device, e.g. LEMF device 128 or LEA device 130. Operation proceeds from step 1004, via connecting node E 1006, to step 1008.

In step 1008 the mediation device 118 receives fourth intercepted encrypted traffic corresponding to the first intercept request from the point of interception (POI) device 116, said fourth intercepted encrypted traffic including a set of encrypted traffic corresponding to a third content delivery network, e.g., CDN3 134, for which the security device 120 does not have a private key and thus cannot decrypt the encrypted traffic. Operation proceeds from step 1008 to step 1010.

In step 1010 the mediation device 118 communicates the fourth intercepted encrypted traffic to the security device 120. Operation proceeds from step 1010 to step 1012.

In step 1012 the security device 120 attempts to decrypt the fourth intercepted encrypted traffic but is unsuccessful since it does not have the private key corresponding to the third content delivery network, e.g., CDN3 134. Operation proceeds from step 1012 to step 1014.

In step 1014 the security device 120 determines that it is unable to decrypt the fourth intercepted encrypted traffic. Operation proceeds from step 1014 to step 1016.

In step 1016 the security device 120 communicates an indication that the security device 120 is unable to decrypt the fourth intercepted encrypted traffic to the mediation device 118. Operation proceeds from step 1016 to step 1018.

In step 1018 the mediation device 118 receives the indication that the security device 120 is unable to decrypt the fourth intercepted encrypted traffic. Operation proceeds from step 1018 to step 1020.

In step 1020 the mediation devices 118 sends, in response to the received indication that the security device 120 is unable to decrypt the fourth intercepted encrypted traffic, the fourth intercepted encrypted traffic from the mediation device 118 to the law enforcement device, e.g., LEMF device 128 and/or LEA device 130.

In some embodiments, the mediation device 118 and security device, e.g., LISE 120, are separate physical entities, said mediation device 118 not having access to content delivery network private keys stored in the security device 120. In some such embodiments, the security device 120 stores the private keys in a secure memory within the security device 120 which is not accessible to system administrators who operates or control the security device 120.

In some embodiments, the security device, e.g., LISE 120, is part of the mediation device 118. In some such embodiments, the security device 120 stores the private keys in a secure memory within the security device 120 which is not accessible to system administrators who operate or control the mediation device 118.

FIG. 6 is a drawing of an exemplary assembly of components 1100, which may be included in a mediation device, e.g., mediation device 118 of FIGS. 1 and 2, mediation device 300 of FIG. 3, a mediation device implementing steps of the method of signaling diagram of FIG. 2, and/or a mediation device implementing steps of the method of flowchart 900 of FIG. 5.

The components in the assembly of components 1100 can, and in some embodiments are, implemented fully in hardware within a processor, e.g., processor 702, e.g., as individual circuits. The components in the assembly of components 1100 can, and in some embodiments are, implemented fully in hardware within the assembly of hardware components 710, e.g., as individual circuits corresponding to the different components. In other embodiments some of the components are implemented, e.g., as circuits, within processor 702 with other components being implemented, e.g., as circuits within assembly of components 710, external to and coupled to the processor 702. As should be appreciated the level of integration of components on the processor and/or with some components being external to the processor may be one of design choice. Alternatively, rather than being implemented as circuits, all or some of the components may be implemented in software and stored in the memory 712 of the mediation device 700, with the components controlling operation of mediation device 700 to implement the functions corresponding to the components when the components are executed by a processor e.g., processor 702. In some such embodiments, the assembly of components 1100 is included in the memory 712 as part of an assembly of software components 722. In still other embodiments, various components in assembly of components 1100 are implemented as a combination of hardware and software, e.g., with another circuit external to the processor providing input to the processor which then under software control operates to perform a portion of a component's function.

When implemented in software the components include code, which when executed by a processor, e.g., processor 702, configure the processor to implement the function corresponding to the component. In embodiments where the assembly of components 1100 is stored in the memory 712, the memory 712 is a computer program product comprising a computer readable medium comprising code, e.g., individual code for each component, for causing at least one computer, e.g., processor 702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 6 control and/or configure the mediation device 700 or elements therein such as the processor 702, to perform the functions of corresponding steps illustrated and/or described in the method of one or more of the flowcharts, signaling diagrams and/or described with respect to any of the Figures. Thus, the assembly of components 1100 includes various components that perform functions of corresponding one or more described and/or illustrated steps of an exemplary method, e.g., steps of the method of signaling diagram 200 of FIG. 2 and/or steps of the method of flowchart 900 of FIG. 5.

Assembly of components 1100 includes a component 1102 configured to operate the mediation device to receive and process a provisioned intercept request, a component 1104 configured to operate the mediation device to generate and send an interception request to a point of interception (POI) device, a component 1106 configured to operate the mediation device to receive a filtering request specifying a filtering rule, a component 1108 configured to operate the mediation device to signal a security device that the security device should obtain a private key for a content delivery network if it does not have such a key, a component 1110 configured to operate the mediation device to receive intercepted encrypted traffic corresponding to an intercept request from a point of interception device, a component 1111 configured to operate the mediation device to send received encrypted traffic to a security device for a decryption attempt, a component 1112 configured to operate the mediation device to receive a decrypted version of the intercepted encrypted traffic, and in some embodiments, an indication of the content delivery network to which the intercepted traffic corresponds or and indication that the security device was unable to decrypt the intercepted encrypted content. Assembly of components 1100 further includes a component 1114 configured to determine the content delivery network to which the intercepted encrypted content corresponds, a component 1116 configured to determine the user device to which the intercepted encrypted content corresponds, a component 1118 configured to make an intercepted encrypted content handing decision based on a received filtering rule, and a component 1120 configured to operate the mediation device to implement a handling decision, e.g., discard the intercepted encrypted traffic, send the intercepted encrypted traffic and corresponding decrypted traffic to a law enforcement device, or send the intercepted encrypted traffic, which could not be decrypted, to the law enforcement device.

Component 1102 is, e.g., used to implement step 904 of the method of flowchart 900 of FIG. 5. Component 1104 is, e.g., used to implement step 906 of the method of flowchart 900 of FIG. 5. Component 1106 is, e.g., used to implement steps 908 and 922 of the method of flowchart 900 of FIG. 5. Component 1108 is, e.g., used to implement steps 910 and 924 of the method of flowchart 900 of FIG. 5. Component 1110 is, e.g., used to implement steps 936, 960, 984 and 1008 of the method of flowchart 900 of FIG. 5. Component 1111 is, e.g., used to implement steps 938, 962, 986 and 1010 of the method of flowchart 900 of FIG. 5. Component 1112 is, e.g., used to implement steps 946, 948, 970, 972, 994, 996, and 1018 of the method of flowchart 900 of FIG. 5. Component 1114 is, e.g., used to implement steps 950, 974 and 998 of the method of flowchart 900 of FIG. 5. Component 1116 is, e.g., used to implement steps 952, 976, 1000, of the method of flowchart 900 of FIG. 5. Component 1118 is, e.g., used to implement steps 952, 954, 976, 978, 1000 and 1002 of the method of flowchart 900 of FIG. 5. Component 1120 is, e.g., used to implement steps 956, 980, 1004 and 1020 of the method of flowchart 900 of FIG. 5.

FIG. 7 is a drawing of an exemplary assembly of components 1200, which may be included in a security device, e.g., LISE 120 of FIGS. 1 and 2, security device 400 of FIG. 4, a security device, e.g., a LISE, implementing steps of the method of signaling diagram of FIG. 2, and/or a security device implementing steps of the method of flowchart 900 of FIG. 5.

The components in the assembly of components 1200 can, and in some embodiments are, implemented fully in hardware within a processor, e.g., processor 802, e.g., as individual circuits. The components in the assembly of components 1200 can, and in some embodiments are, implemented fully in hardware within the assembly of hardware components 810, e.g., as individual circuits corresponding to the different components. In other embodiments some of the components are implemented, e.g., as circuits, within processor 802 with other components being implemented, e.g., as circuits within assembly of components 810, external to and coupled to the processor 802. As should be appreciated the level of integration of components on the processor and/or with some components being external to the processor may be one of design choice. Alternatively, rather than being implemented as circuits, all or some of the components may be implemented in software and stored in the memory 812 of the security device 800, with the components controlling operation of security device 800 to implement the functions corresponding to the components when the components are executed by a processor e.g., processor 802. In some such embodiments, the assembly of components 1200 is included in the memory 812 as part of an assembly of software components 822. In still other embodiments, various components in assembly of components 1200 are implemented as a combination of hardware and software, e.g., with another circuit external to the processor providing input to the processor which then under software control operates to perform a portion of a component's function.

When implemented in software the components include code, which when executed by a processor, e.g., processor 802, configure the processor to implement the function corresponding to the component. In embodiments where the assembly of components 1200 is stored in the memory 812, the memory 812 is a computer program product comprising a computer readable medium comprising code, e.g., individual code for each component, for causing at least one computer, e.g., processor 802, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the security device 800 or elements therein such as the processor 802, to perform the functions of corresponding steps illustrated and/or described in the method of one or more of the flowcharts, signaling diagrams and/or described with respect to any of the Figures. Thus, the assembly of components 1200 includes various components that perform functions of corresponding one or more described and/or illustrated steps of an exemplary method, e.g., steps of the method of signaling diagram 200 of FIG. 2 and/or steps of the method of flowchart 900 of FIG. 5.

Assembly of components 1200 includes a component 1202 configured to operate the security device to receive a request from a mediation device indicating that the security device should obtain a private key for a particular content delivery network if it does not have such a key, a component 1204 configured to operate the security device to check if the security device already has a valid private key corresponding to the content delivery network, and a component 1206 configured to operate the security device to send, from the security device, and a request for a private key corresponding to a particular content delivery network, e.g. a request for a certificate and corresponding private key corresponding to the particular CDN. Assembly of components 1200 further includes a component 1210 configured to operate the security device to received and store a private key corresponding to a CDN, a component 1212 configured to operate the security device to receive, from a mediation device, intercepted encrypted traffic, a decryption engine 1214 configured to perform decryption of received intercepted encrypted traffic using a private key, a component 1216 configured to operate the security device to attempt to decrypt received intercepted encrypted traffic using the private keys that it has available and to generate a decrypted version of the received intercepted encrypted traffic when possible, a component 1218 configured to determine the content delivery network to which the intercepted encrypted traffic corresponds, and a component 1220 configured to operate the security device to send to the mediation device: i) a decrypted version of the received intercepted encrypted traffic, optionally, along with an indicator indicating the content delivery network to which the content corresponds, or ii) an indication that the security device was unable to decrypted the received intercepted encrypted content.

Component 1204 is, e.g., used to implement steps 912 and 926 of the method of flowchart 900 of FIG. 5. Component 1206 is, e.g., used to implement steps 914 and 928 of the method of flowchart 900 of FIG. 5. Component 1208 is, e.g., used to implement steps 916 and 930 of the method of flowchart 900 of FIG. 5. Components 1214 and 1216 are, e.g., used to implement steps 940, 964, 988, 1012, and 1014 of the method of flowchart 900 of FIG. 5. Component 1218 is, e.g., used to implement steps 952, 954, 976, 978, 1000 and 1002 of the method of flowchart 900 of FIG. 5. Component 1220 is, e.g., used to implement steps 942, 944, 966, 968, 990, 992 and 1016 of the method of flowchart 900 of FIG. 5.

Various aspects and/or features of some embodiments of the present invention are further described below. To deliver better services to consumers, there is a constant need to increase Internet speeds to consumers from every Internet Service Provider (ISP) globally. Over time more and more video content is being shifted to being delivered over IP from other more traditional methods. It is expectedthat IP Video will represent 82% of all traffic. This increase has a knock-on effect on the amount of data being delivered to all services as well as for Lawful Intercept. Commercial IP Video has limited investigative value in an intercept for law enforcement due to its generic nature. As a result, there are cases where it would be desirable to exclude IP Video out of delivery to Law Enforcement to save bandwidth and processing requirements. This would reduce the amount of traffic intercepted from the target as well as traffic delivered to the Law Enforcement Agency (LEA).

To achieve this reduction, in some embodiments of the present invention, a Lawful Intercept Mediation Device or a security device, e.g., LISE, coupled to the mediation device, would be included or be allowed access to the Public Key Infrastructure used to deliver video. Any traffic from a specific Content Delivery Network would be using a specific Transport Layer Security (TLS) Certificate. This Certificate would also be acquired and present on the Mediation Device or a security device, e.g., LISE, coupled to the Lawful Intercept Mediation Device, that is used to perform Lawful Intercept within the Internet Service Provider (ISP) network. During an intercept the traffic would be inspected and if that traffic matched that Certificate it could be excluded partially or fully, e.g. based on filtering rules, from the intercept that is ultimately delivered to Law Enforcement automatically.

To deliver IP Video a Content Delivery Network (CDN) is created. This is a distributed network of servers that contain copies of the desired media that a consumer will watch on an endpoint device. Regardless of the type of device, smart tv, laptop, tablet, or phone, all IP Video will be delivered from a server in the CDN to the end device over the internet. Since 2016 most major IP Video services have been using TLS to protect customer privacy. The use of TLS prevents an ISP from being able to deploy deep packet inspection to determine if a particular packet was an IP video packet. In order to deliver at scale, a CDN will use a common certificate with several Subject Alternative names that will include any possible domain names that the IP Video traffic would be sent from.

To perform a lawful intercept an ISP deploys equipment capable of performing the intercept and delivering the intercepted data to the LEA. The equipment that performs this work is referred to as the Mediation Device (MD). It sits within the ISP network and provisions a network device, e.g., a Point of Interception (POI) device, e.g., a switch, where the intercept actually occurs. The intercepted traffic is duplicated and a copy sent to the MD. The mediation device operating in conjunction with a security device, e.g. a lawful intercept secrets engine (LISE) including one or more private keys processes intercepted traffic. The security device attempts to decrypt intercepted encrypted traffic using its private keys, and, in some embodiments, determines which CDN the intercepted traffic corresponds to. Decrypted traffic is subjected to filtering rules, by the mediation device, to determine which intercepted traffic should be sent to the LEA and which should be discarded. The traffic which is not filtered out is delivered to the LEA.

The very nature of Commercial IP Video means that it is mass-produced and mass-consumed. There are cases where some IP Video may be useful to an investigation by law enforcement but in general, the traffic has no investigative value. With IP Video making up 82% of all IP traffic having the option to not deliver that traffic translates into potential cost savings for both the ISP and the LEA. The need for a 1 Gigabit capacity for each intercept turns into 220 Mbps.

In a traditional CDN deployment, the TLS certificates and keys are only present on the CDN servers. In accordance with one feature of the invention, the TLS certificate corresponding to a CDN which provides intercepted traffic is installed on both the CDN and a security device, e.g., a LISE associated with the mediation device. With access to the certificates, the MD operating with the security device, is able to do two things. First, it's able to guarantee that the CDN traffic matches since only legitimate CDN traffic would sign with the correct certificate. Second, it's able to decrypt the traffic using the TLS certificate for a specific CDN. Decryption of data being communicated allows for the identification of the IP Video streams by the Mediation Device and to stop the delivery of those streams to the LEA that are of no interest to the LEA.

NUMBERED LIST OF EXEMPLARY METHOD EMBODIMENTS

Method Embodiment 1

A communications method, the method comprising: receiving (352 or 390 or 936) at a mediation device (118) first intercepted encrypted traffic corresponding to a first intercept request from a point of interception device (118) communicating (354 or 392 or 938) the first intercepted encrypted traffic to a security device (LISE) (120) which includes one or more private keys corresponding to one or more content delivery networks (e.g., CDN1 and/or CDN2); receiving (366 or 404 or 946), a decrypted version of the first intercepted encrypted traffic (e.g. returned by the security device, information indicating the content delivery network to which the decrypted traffic corresponds being communicated within the decrypted traffic and/or being communicated along with the decrypted traffic, e.g. as determined based on the private key of a CDN, e.g., CDN1 132, which was able to be used to decrypt and/or check the signature on first intercepted encrypted traffic); and making (370 or 408 or 952), at the mediation device, a first intercepted encrypted traffic handling decision (e.g. a decision on how to handle the intercepted content based on a filtering rule) based on a filtering rule that depends on what content delivery network the first intercepted encrypted traffic corresponds to, said traffic handling decision including a decision to: i) discard at least some of said first intercepted encrypted traffic without forwarding to a law enforcement device (LEMF 128 or LEA 130) or ii) forward as least some of said first intercepted traffic to a law enforcement device (LEMF 128 or LEA 130).

Method Embodiment 2

The method of Method Embodiment 1, further comprising: receiving (272 or 908), at the mediation device (118), prior to making the first intercepted traffic handling decision, a first filtering request specifying a first filtering rule, said first filtering rule being that intercepted content corresponding to a first content delivery network (e.g., CDN1 132) is not be forwarded to the law enforcement device (LEMF 128 or LEA 130).

Method Embodiment 1A

The method of Method embodiment 1, wherein the security device is external to and a separate device from the mediation device.

Method Embodiment 1AA

The method of Method Embodiment 1A wherein the security device is coupled to multiple mediation devices and provides decryption services to multiple different mediation devices; and wherein the number of mediation devices in the network exceeds the number of security devices in the network with private keys of content delivery networks, the security devices being separate physical devices from said mediation devices.

Method Embodiment 1B

The method of method embodiment 1, wherein the security device is a secure device internal to the mediation device; and wherein a processor in the mediation device controls communication of encrypted data to the security device and receives decrypted data from the security device.

Method Embodiment 2A

The method of Method Embodiment 2, further comprising: signaling (274 or 910), in response to receiving the first filtering request, to the security device (LISE 120) that the security device (120) should obtain a private key for the first content delivery network (e.g., CDN1 132) if it does not have such a key; and checking (280 or 912), at the security device (120) if the security device (120) already has a valid private key for the first content delivery network (e.g., CDN1 132).

Method Embodiment 2B

The method of Method Embodiment 2A, further comprising: operating (284 or 914) the security device (120) to request (e.g. via a secure communications link) a private key corresponding to the first content delivery network in response to determining that the security device (120) does not have a valid private key for the first content delivery network (CDN1 132).

Method Embodiment 3

The method of Method Embodiment 2, wherein the first filtering rule indicates that intercepted traffic corresponding to (e.g., was obtained from or originating from) a first content delivery network (e.g., CDN1 132) should not be forwarded to the law enforcement device (LEMF 128 or LEA 130) (e.g., the first rule indicates that information from CDN1 132 which is a movie or other pre-recorded content delivery provider such as Netflix should not be forwarded as part of the intercept request and thus should be discarded by the mediation device 118).

Method Embodiment 4

The method of Method Embodiment 3, further comprising: determining (368 or 406 or 950), at the mediation device (118), that the first intercepted encrypted traffic corresponds to the first content delivery network (e.g., CDN1 132) (e.g., based on an indication from the LISE 120 that the first intercepted content was signed using the private key of CDN1 132 or was decrypted by the private key of CDN1 132 as indicated in information supplied to the MD 118 with the decrypted content provided by the LISE 120 or based on an indication, e.g. a CDN1 identifier, in the received decrypted traffic indicating that the traffic corresponds to CDN1); and wherein making (370 or 406 or 952), at the mediation device (118), the first intercepted traffic handling decision includes deciding (954) to discard said first intercepted encrypted traffic without forwarding to a law enforcement device (LEMF 128 or LEA 130).

Method Embodiment 5

The method of Method Embodiment 4, further comprising: sending (284 or 916), from the security device (LISE 120) a request for a private key corresponding to the first content delivery network (CDN1 132) (e.g. as part of a request for a TLS certificate and the private key corresponding to the first content delivery network (CDN1 132) sent from security device (LISE (120)) to a first security key server (170) that is included in CDN1 132); receiving (294 or 918) at the security device (LISE 120) a private key corresponding to the first content delivery network (CDN1 132).

Method Embodiment 6

The method of Method Embodiment 5, further comprising: decrypting, (360 or 398 or 940) at the security device (LISE 120) the first intercepted encrypted traffic to generate said decrypted version of the first intercepted encrypted traffic; and communicating (362 or 400 or 942) from the security device (LISE 120) to the mediation device (118) the decrypted version of the first intercepted encrypted traffic.

Method Embodiment 6A

The method of Method Embodiment 6, further comprising: communicating (362 or 400 or 944) information indicating the content delivery network to which the first intercepted encrypted traffic corresponds along with the decrypted version of the first intercepted traffic.

Method Embodiment 6B

The method of Method Embodiment 6, wherein the communicated decrypted version of the first intercepted encrypted traffic includes an identifier indicating the content delivery network to which the first encrypted traffic corresponds.

Method Embodiment 7

The method of Method Embodiment 1, further comprising: receiving (272 or 908), at the mediation device (118), prior to making the first intercepted traffic handling decision, a first filtering request specifying a first filtering rule, said first filtering rule being that intercepted content corresponding to a first content delivery network (e.g., CDN1 132) is not be forwarded to the law enforcement device (LEMF 128 or LEA 130).

Method Embodiment 8

The method of Method Embodiment 2, further comprising: receiving (310 or 922), at the mediation device (118), a second filtering request specifying a second filtering rule, said second filtering rule being that intercepted content corresponding to a second content delivery network (CDN2 133) and the first target device (user device 1 108) is to be forwarded but that second content delivery network (CDN2 133) traffic corresponding to other user devices (e.g., user device 2 110) should not be forwarded to the law enforcement device (e.g., LEMF 128 or LEA 130) (e.g., because it is not of interest).

Method Embodiment 9

The method of Method Embodiment 8, further comprising: receiving (426 or 960), at the mediation device (118), second intercepted encrypted traffic corresponding to the first interception request from the point of interception device (118), said second encrypted intercepted traffic including a first set of encrypted traffic corresponding to the first target device (user 1 device 108) and the second content delivery network (CDN2 133); communicating (428 or 962) the second intercepted encrypted traffic to the security device (LISE) (120); receiving (440 or 970), at the mediation device (118) a decrypted version of the second intercepted encrypted traffic (e.g. returned by the security device (LISE 120), information indicating the content delivery network (e.g., CDN2 133) to which the decrypted version of the second intercepted encrypted traffic corresponds being communicated within the decrypted traffic and/or being communicated along with the decrypted traffic, e.g. as determined based on the private key of a CDN, e.g., CDN2 133, which was able to be used to decrypt and/or check the signature on second intercepted encrypted traffic); and making (446 or 976), at the mediation device (118), a second intercepted encrypted traffic handling decision (e.g. a decision on how to handle intercepted second encrypted content based on the second filtering rule) based on the second filtering rule that applies to content corresponding to the second content delivery network, said traffic handling decision including making (978) a decision to forward the decrypted version of the second intercepted encrypted traffic to the law enforcement device (LEA 130) (since the second set of intercepted encrypted traffic corresponds to the target user device (user device 1 108) and the second CDN (CDN2 133)).

Method Embodiment 10

The method of Method Embodiment 9, further comprising: communicating (446 or 980) the second intercepted encrypted traffic along with the decrypted version of the second intercepted encrypted traffic to the law enforcement device (128 and/or 130) (e.g., so that there is a clear chain of custody with regard to the encrypted and decrypted content being provided to the law enforcement device 128 and/or 130).

Method Embodiment 11

The method of Method Embodiment 10, further comprising: receiving (474 or 984), at the mediation device (118), third intercepted encrypted traffic corresponding to the first interception request from the point of interception device (116), said third intercepted encrypted traffic including a set of encrypted traffic corresponding to a second user device (user device 2 110) which is not a target of an interception request and which also corresponds to the second content delivery network (CDN2 133); communicating (476 or 986) the third intercepted encrypted traffic to the security device (LISE 120); receiving (488 or 994), at the mediation device (118) a decrypted version of the third intercepted encrypted traffic (e.g. returned by the security device 120, information indicating the content delivery network (e.g., CDN2 133) to which the decrypted version of the third intercepted encrypted traffic corresponds being communicated along with the decrypted version of the third intercepted encrypted traffic and/or information (e.g., a CDN2 identifier) identifying the second content delivery network (CDN2 133) being communicated within the decrypted version of the third intercepted encrypted traffic); and making (494 or 1000), at the mediation device (118), a third intercepted encrypted traffic handling decision (e.g. a decision on how to handle third intercepted encrypted content based on the second filtering rule) based on the second filtering rule that applies to content corresponding to the second content delivery network (CDN2 133), said third traffic handling decision including making (1002) a decision to discard the third traffic corresponding to the second content delivery network (CDN2 133) and the second user device (user device 2 110) which is not a target of an interception request.

Method Embodiment 12

The method of Method Embodiment 11, further comprising: discarding (494 or 1004) at the mediation device (118) the third intercepted traffic (e.g., without forwarding it to the law enforcement device (LEMF 128 or LEA 130).

Method Embodiment 13

The method of Method Embodiment 12, further comprising: receiving (512 or 1008), at the mediation device, fourth intercepted encrypted traffic corresponding to the first interception request from the point of interception device (116), said fourth encrypted intercepted traffic corresponding to a third content delivery network (CDN3 134) for which said security device (LISE 120) does not have a private key and thus can not decrypt the fourth encrypted content; receiving (526 or 1018), at the mediation device, an indication at the mediation device (118) that the security device (LISE 120) is unable to decrypt the fourth intercepted encrypted traffic; and sending (528 or 1020) the fourth intercepted encrypted traffic, in response to the indication (526) that the security device (LISE 120) is unable to decrypt the fourth intercepted encrypted traffic, to the law enforcement device (LEMF 128 and/or LEA 130).

Method Embodiment 14

The method of Method Embodiment 1, wherein the mediation device (118) and security device (LISE 120) are separate physical entities, said mediation device (118) not having access to content delivery network private keys stored in the security device (LISE 120).

Method Embodiment 15

The method of Method Embodiment 14, wherein the security device (120) stores the private keys in a secure memory within the security device (120) which is not accessible to system administrators who operate or control the security device (120).

Method Embodiment 16

The method of Method Embodiment 1, wherein the security device (LISE 120) is part of the mediation device (118).

Method Embodiment 16A

The method of Method Embodiment 16, wherein the security device (120) stores the private keys in a secure memory within the security device (120) which is not accessible to system administrators who operate or control the mediation device (118).

Method Embodiment 17

The method of Method Embodiment 1, further comprising: receiving (240 or 904), at the mediation device (118) an intercept request, said intercept request including an IP address of the first target device and one or more unique target identifiers (e.g., MAC address, IMEI, IMSI, and/or TN); and sending (242 or 906), from the mediation device (118), a first interception request to a point of interception (POI) device (116), said first interception request including the IP address of the first target device (but not including the received one or more unique target identifiers).

NUMBERED LIST OF EXEMPLARY SYSTEM EMBODIMENTS

System Embodiment 1

A communications system, the system comprising: a mediation device (118 or 700) including: a receiver (716); a transmitter (718); and a first processor (702) configured to operate the mediation device to: receive (352 or 390 or 936), at the mediation device (118) (via receiver 716), first intercepted encrypted traffic corresponding to a first intercept request from a point of interception device (118); communicate (354 or 392 or 938) (via transmitter 718) the first intercepted encrypted traffic from the mediation device (118) to a security device (LISE) (120) which includes one or more private keys corresponding to one or more content delivery networks (e.g., CDN1 and/or CDN2); receive (366 or 404 or 946), at the mediation device (118) (via receiver 716), a decrypted version of the first intercepted encrypted traffic (e.g. returned by the security device, information indicating the content delivery network to which the decrypted traffic corresponds being communicated within the decrypted traffic and/or being communicated along with the decrypted traffic, e.g. as determined based on the private key of a CDN, e.g., CDN1 132, which was able to be used to decrypt and/or check the signature on first intercepted encrypted traffic); and make (370 or 408 or 952), at the mediation device, a first intercepted encrypted traffic handling decision (e.g. a decision on how to handle the intercepted content based on a filtering rule) based on a filtering rule that depends on what content delivery network the first intercepted encrypted traffic corresponds to, said traffic handling decision including a decision to: i) discard at least some of said first intercepted encrypted traffic without forwarding to a law enforcement device (LEMF 128 or LEA 130) or ii) forward as least some of said first intercepted traffic to a law enforcement device (LEMF 128 or LEA 130).

System Embodiment 2

The communications system of System Embodiment 1, wherein said first processor (702) is further configured to operate the mediation device (118) to: receive (272 or 908), at the mediation device (118) (via receiver 716), prior to making the first intercepted traffic handling decision, a first filtering request specifying a first filtering rule, said first filtering rule being that intercepted content corresponding to a first content delivery network (e.g., CDN1 132) is not be forwarded to the law enforcement device (LEMF 128 or LEA 130).

System Embodiment 2A

The communications system of System Embodiment 2, wherein said first processor (702) is further configured to operate the mediation device (118) to: signal (274 or 910) (via transmitter 718), in response to receiving the first filtering request, to the security device (LISE 120) that the security device (120) should obtain a private key for the first content delivery network (e.g., CDN1 132) if it does not have such a key; and wherein the communications system further comprises said security device (120) including a second processor (802) configured to check (280 or 912), at the security device (120) if the security device (120) already has a valid private key for the first content delivery network (e.g., CDN1 132).

System Embodiment 2B

The communications system of System Embodiment 2A, wherein said second processor (802) is further configured to: operate (284 or 914) the security device (120) to request (e.g., via a secure communications link) a private key corresponding to the first content delivery network in response to determining that the security device (120) does not have a valid private key for the first content delivery network (CDN1 132).

System Embodiment 3

The communications of System Embodiment 2, wherein the first filtering rule indicates that intercepted traffic corresponding to (e.g., was obtained from or originating from) a first content delivery network (e.g., CDN1 132) should not be forwarded to the law enforcement device (LEMF 128 or LEA 130) (e.g., the first rule indicates that information from CDN1 132 which is a movie or other pre-recorded content delivery provider such as Netflix should not be forwarded as part of the intercept request and thus should be discarded by the mediation device 118).

System Embodiment 4

The communications system of System Embodiment 3, wherein said first processor (702) is further configured to: determine (368 or 406 or 950), at the mediation device (118), that the first intercepted encrypted traffic corresponds to the first content delivery network (e.g., CDN1 132) (e.g., based on an indication from the LISE 120 that the first intercepted content was signed using the private key of CDN1 132 or was decrypted by the private key of CDN1 132 as indicated in information supplied to the MD 118 with the decrypted content provided by the LISE 120 or based on an indication, e.g. a CDN1 identifier, in the received decrypted traffic indicating that the traffic corresponds to CDN1); and wherein making (370 or 406 or 952), at the mediation device (118), the first intercepted traffic handling decision includes deciding (954) to discard said first intercepted encrypted traffic without forwarding to a law enforcement device (LEMF 128 or LEA 130).

System Embodiment 5

The communications system of System Embodiment 4, wherein said security device (120) includes: a receiver (816); a transmitter (818); and a second processor (802); and wherein said second processor (802) is configured to operate the security device (120) to: send (284 or 916) (via transmitter 818), from the security device (LISE 120) a request for a private key corresponding to the first content delivery network (CDN1 132) (e.g. as part of a request for a TLS certificate and the private key corresponding to the first content delivery network (CDN1 132) sent from security device (LISE (120)) to a first security key server (170) that is included in CDN1 132); receive (294 or 918) (via receiver 816) at the security device (LISE 120) a private key corresponding to the first content delivery network (CDN1 132).

System Embodiment 6

The communications system of System Embodiment 5, wherein said second processor (802) is further configured to: decrypt, (360 or 398 or 940) at the security device (LISE 120) the first intercepted encrypted traffic to generate said decrypted version of the first intercepted encrypted traffic; and operate the security device (120) to communicate (362 or 400 or 942) (via transmitter 818) from the security device (LISE 120) to the mediation device (118) the decrypted version of the first intercepted encrypted traffic.

System Embodiment 6A

The communications system of System Embodiment 6, wherein said second processor is further configured to: operate the security device (120) to communicate (362 or 400 or 944) (via transmitter 818) information indicating the content delivery network to which the first intercepted encrypted traffic corresponds along with the decrypted version of the first intercepted traffic.

System Embodiment 6B

The communications system of System Embodiment 6, wherein the communicated decrypted version of the first intercepted encrypted traffic includes an identifier indicating the content delivery network to which the first encrypted traffic corresponds.

System Embodiment 7

The communications system of System Embodiment 1, wherein said first processor (702) is further configured to operate the mediation device (118) to: receive (272 or 908), at the mediation device (118) (via receiver 718), prior to making the first intercepted traffic handling decision, a first filtering request specifying a first filtering rule, said first filtering rule being that intercepted content corresponding to a first content delivery network (e.g., CDN1 132) is not be forwarded to the law enforcement device (LEMF 128 or LEA 130).

System Embodiment 8

The communications system of System Embodiment 2, wherein said first processor (702) is further configured to operate the mediation device (118) to: receive (310 or 922), at the mediation device (118) (via receiver 716), a second filtering request specifying a second filtering rule, said second filtering rule being that intercepted content corresponding to a second content delivery network (CDN2 133) and the first target device (user device 1 108) is to be forwarded but that second content delivery network (CDN2 133) traffic corresponding to other user devices (e.g., user device 2 110) should not be forwarded to the law enforcement device (e.g., LEMF 128 or LEA 130) (e.g., because it is not of interest).

System Embodiment 9

The communications system of System Embodiment 8, wherein said first processor (702) is further configured to operate the mediation device (118) to: receive (426 or 960), at the mediation device (118) (via receiver 716), second intercepted encrypted traffic corresponding to the first interception request from the point of interception device (118), said second encrypted intercepted traffic including a first set of encrypted traffic corresponding to the first target device (user 1 device 108) and the second content delivery network (CDN2 133); communicate (428 or 962) (via transmitter 718) the second intercepted encrypted traffic to the security device (LISE) (120); receive (440 or 970), at the mediation device (118) (via receiver 716), a decrypted version of the second intercepted encrypted traffic (e.g. returned by the security device (LISE 120), information indicating the content delivery network (e.g., CDN2 133) to which the decrypted version of the second intercepted encrypted traffic corresponds being communicated within the decrypted traffic and/or being communicated along with the decrypted traffic, e.g. as determined based on the private key of a CDN, e.g., CDN2 133, which was able to be used to decrypt and/or check the signature on second intercepted encrypted traffic); and make (446 or 976), at the mediation device (118), a second intercepted encrypted traffic handling decision (e.g. a decision on how to handle intercepted second encrypted content based on the second filtering rule) based on the second filtering rule that applies to content corresponding to the second content delivery network, said traffic handling decision including making (978) a decision to forward the decrypted version of the second intercepted encrypted traffic to the law enforcement device (LEA 130) (since the second set of intercepted encrypted traffic corresponds to the target user device (user device 1 108) and the second CDN (CDN2 133)).

System Embodiment 10

The communications system of System Embodiment 9, wherein said first processor (702) is further configured to: operate the mediation device (118) to communicate (446 or 980) (via transmitter 718) the second intercepted encrypted traffic along with the decrypted version of the second intercepted encrypted traffic to the law enforcement device (128 and/or 130) (e.g., so that there is a clear chain of custody with regard to the encrypted and decrypted content being provided to the law enforcement device 128 and/or 130).

System Embodiment 11

The communications system of System Embodiment 10, wherein said first processor is further configured to: operate the mediation device to: receive (474 or 984), at the mediation device (118) (via receiver 716), third intercepted encrypted traffic corresponding to the first interception request from the point of interception device (116), said third intercepted encrypted traffic including a set of encrypted traffic corresponding to a second user device (user device 2 110) which is not a target of an interception request and which also corresponds to the second content delivery network (CDN2 133); communicate (476 or 986) (via transmitter 718) the third intercepted encrypted traffic to the security device (LISE 120); receive (488 or 994), at the mediation device (118) (via receiver 716), a decrypted version of the third intercepted encrypted traffic (e.g. returned by the security device 120, information indicating the content delivery network (e.g., CDN2 133) to which the decrypted version of the third intercepted encrypted traffic corresponds being communicated along with the decrypted version of the third intercepted encrypted traffic and/or information (e.g., a CDN2 identifier) identifying the second content delivery network (CDN2 133) being communicated within the decrypted version of the third intercepted encrypted traffic); and make (494 or 1000), at the mediation device (118), a third intercepted encrypted traffic handling decision (e.g. a decision on how to handle third intercepted encrypted content based on the second filtering rule) based on the second filtering rule that applies to content corresponding to the second content delivery network (CDN2 133), said third traffic handling decision including making (1002) a decision to discard the third traffic corresponding to the second content delivery network (CDN2 133) and the second user device (user device 2 110) which is not a target of an interception request.

System Embodiment 12

The communications system of System Embodiment 11, wherein said first processor (702) is further configured to operate the mediation device (118) to: discard (494 or 1004) at the mediation device (118) the third intercepted traffic (e.g., without forwarding it to the law enforcement device (LEMF 128 or LEA 130).

System Embodiment 13

The communications system of System Embodiment 12, wherein said first processor (702) is further configured to operate the mediation device (118) to: receive (512 or 1008), at the mediation device (via receiver 716), fourth intercepted encrypted traffic corresponding to the first interception request from the point of interception device (116), said fourth encrypted intercepted traffic corresponding to a third content delivery network (CDN3 134) for which said security device (LISE 120) does not have a private key and thus can not decrypt the fourth encrypted content; receive (526 or 1018), at the mediation device (via receiver 716), an indication at the mediation device (118) that the security device (LISE 120) is unable to decrypt the fourth intercepted encrypted traffic; and send (528 or 1020) (via transmitter 718) the fourth intercepted encrypted traffic, in response to the indication (526) that the security device (LISE 120) is unable to decrypt the fourth intercepted encrypted traffic, to the law enforcement device (LEMF 128 and/or LEA 130).

System Embodiment 14

The communications system of System Embodiment 1, wherein the mediation device (118) and security device (LISE 120) are separate physical entities, said mediation device (118) not having access to content delivery network private keys stored in the security device (LISE 120).

System Embodiment 15

The communications system of System Embodiment 14, wherein the security device (120) stores the private keys in a secure memory within the security device (120) which is not accessible to system administrators who operate or control the security device (120).

System Embodiment 16

The communications device of System Embodiment 1, wherein the security device (LISE 120) is part of the mediation device (118).

System Embodiment 16A

The communications system of System Embodiment 16, wherein the security device (120) stores the private keys in a secure memory within the security device (120) which is not accessible to system administrators who operate or control the mediation device (118).

System Embodiment 17

The communications system of System Embodiment 1, wherein said first processor (702) is further configured to operate the mediation device (118) to; receive (240 or 904), at the mediation device (118) (via receiver 716), an intercept request, said intercept request including an IP address of the first target device and one or more unique target identifiers (e.g., MAC address, IMEI, IMSI, and/or TN); and send (242 or 906), from the mediation device (118) (via transmitter 718), a first interception request to a point of interception (POI) device (116), said first interception request including the IP address of the first target device (but not including the received one or more unique target identifiers).

Numbered List of Exemplary Non-Transitory Computer Readable Medium Embodiments

Non-Transitory Computer Readable Medium Embodiment 1. A non-transitory computer readable medium (712) including computer executable instructions which when executed by a processor (702) of a mediation device (118) cause the mediation device to perform the steps of: receiving (352 or 390 or 936) at the mediation device (118) first intercepted encrypted traffic corresponding to a first intercept request from a point of interception device (118); communicating (354 or 392 or 938) the first intercepted encrypted traffic from the mediation device (118) to a security device (LISE) (120) which includes one or more private keys corresponding to one or more content delivery networks (e.g., CDN1 and/or CDN2); receiving (366 or 404 or 946), at the mediation device (118) a decrypted version of the first intercepted encrypted traffic (e.g. returned by the security device, information indicating the content delivery network to which the decrypted traffic corresponds being communicated within the decrypted traffic and/or being communicated along with the decrypted traffic, e.g. as determined based on the private key of a CDN, e.g., CDN1 132, which was able to be used to decrypt and/or check the signature on first intercepted encrypted traffic); and making (370 or 408 or 952), at the mediation device, a first intercepted encrypted traffic handling decision (e.g. a decision on how to handle the intercepted content based on a filtering rule) based on a filtering rule that depends on what content delivery network the first intercepted encrypted traffic corresponds to, said traffic handling decision including a decision to: i) discard at least some of said first intercepted encrypted traffic without forwarding to a law enforcement device (LEMF 128 or LEA 130) or ii) forward as least some of said first intercepted traffic to a law enforcement device (LEMF 128 or LEA 130).

Non-Transitory Computer Readable Medium Embodiment 2. A non-transitory computer readable medium (812) including computer executable instructions which when executed by a processor (802) of a security device (e.g., USE 120) cause the security device to perform the steps of: sending (284 or 916), from the security device (LISE 120) a request for a private key corresponding to the first content delivery network (CDN1 132) (e.g. as part of a request for a TLS certificate and the private key corresponding to the first content delivery network (CDN1 132) sent from security device (LISE (120)) to a first security key server (170) that is included in CDN1 132); receiving (294 or 918) at the security device (LISE 120) a private key corresponding to the first content delivery network (CDN1 132).

While in many embodiments the mediation device and security device are separate physical entities in some embodiments the security device is a secure component within the mediation device with the processor of the mediation device sending encrypted content received by the mediation devices interface to the security device for decryption and receiving in response decrypted content from the security device included in the mediation device. In some such embodiments components outside the security device do not have direct access to the keys stored in the security device.

Various embodiments are directed to apparatus, e.g., mediation devices, security devices, CDN devices, point of interception devices, e.g. switches, lawful interception devices, base stations, e.g. CBSDs, cable modems (CMs), cable modem termination systems (CMTS), base stations supporting massive MIMO such as CBSDs supporting massive MIMO, network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), a Spectrum Access System (SAS), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating a mediation device, a security device, a CDN device, point of interception device, e.g. switch, lawful interception device, a base station, e.g. a CBSD, a cable modems (CM), a cable modem termination system (CMTS), a base station supporting massive MIMO such as a CBSD supporting massive MIMO, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, SAS, an AFC system, cable networks, cloud networks, nodes, servers, cloud service servers, customer premises equipment devices, controllers, network monitoring nodes and/or servers and/or cable or network equipment devices. Various embodiments are directed to communications network which are partners, e.g., CSP network, a law enforcement network, a CDN network, a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

While the invention has been described in the context of a cable delivery system which uses a DOCSIS modem and coaxial cable in some embodiments, the methods and apparatus can be used in the context of other cable and modem combinations. In fact, the methods and apparatus can be used with a fiber optic cable and optical modem and/or with other types of cables and modems. Thus, it should be appreciated that a base station can use the described methods with a wide range of cable and modem combinations.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., mediation device, a security device, a CDN device, a point of interception device, e.g. switch, a lawful interception device, a base station, e.g. CBSD, a cable modems (CM), a cable modem termination system (CMTS), a base station supporting massive MIMO such as a CBSD supporting massive MIMO, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, SAS, a AFC system, etc., said device including a processor configured to implement one, multiple or all of the steps of one or more methods of the invention.

In some embodiments, the processor or processors, e.g., CPUs, of one or more devices, e.g., a mediation device, a security device, a CDN device, a point of interception device, e.g. switch, a lawful interception device, a base station, e.g. a CBSD, a cable modems (CM), cable modem termination system (CMTS), a base station supporting massive MIMO such as a CBSD supporting massive MIMO, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a SAS, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., a mediation device, security device, a CDN device, a point of interception device, e.g. switch, a lawful interception device, a base station, e.g. a CBSD, a cable modem (CM), a cable modem termination system (CMTS), a base station supporting massive MIMO such as a CBSD supporting massive MIMO, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as e.g., e.g., mediation device, a security device, a CDN device, a point of interception device, e.g. switch, a lawful interception device, a base station, e.g. CBSD, a cable modem (CM), a cable modem termination systems (CMT), a base station supporting massive MIMO such as a CBSD supporting massive MIMO, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a mediation device, a security device, a CDN device, a point of interception device, e.g. switch, a lawful interception device, a base station, e.g. CBSD, a cable modem (CM), a cable modem termination system (CMTS), a base station supporting massive MIMO such as a CBSD supporting massive MIMO, a network management node or device, a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, security device, a AFC system, MNVO base station, e.g., a CBSD, an MNO cellular base station, e.g., an eNB or a gNB, a HSS server, a UE device, a SAS or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:

receiving, at a mediation device which processes encrypted intercepted data, a first filtering rule, said first filtering rule being that intercepted content corresponding to a first content delivery network not be forwarded to a law enforcement device;

receiving, at the mediation device, a second filtering rule specifying that intercepted content corresponding to a second content delivery network and a first target be forwarded to the law enforcement device; and making, at the mediation device, a first intercepted encrypted traffic handling decision based on at least one of the first and second filtering rules.

2. The method of claim 1, wherein the first content delivery network is a content delivery network used by a video service for delivery of pre-recorded movie content.

3. The method of claim 2, wherein the second filtering rule further specifies that second content delivery network traffic corresponding to user devices other than the first target device should not be forwarded to the law enforcement device.

4. The method of claim 1, further comprising:

determining the content delivery network to which first intercepted encrypted traffic corresponds.

5. The method of claim 4, wherein determining the content delivery network to which first intercepted encrypted traffic corresponds includes determining that the first intercepted encrypted traffic corresponds to the first content delivery network; and wherein making, at the mediation device, a first intercepted encrypted traffic handling decision based on at least one of the first and second filtering rules includes determining to discard the first intercepted encrypted traffic without forwarding to the law enforcement device.

6. The method of claim 4, wherein determining the content delivery network to which first intercepted encrypted traffic corresponds includes determining that the first intercepted encrypted traffic corresponds to the second content delivery network.

7. The method of claim 6, further comprising:

communicating the first intercepted encrypted traffic from the mediation device to a security device; and receiving, from the security device, decrypted traffic generated by decryption of the first intercepted encrypted traffic, said decrypted traffic data including a unique identifier.

8. The method of claim 7, further comprising determining, based on the unique identifier included in the decrypted traffic, that the decrypted traffic corresponds to the target.

9. The method of claim 8, further comprising:

communicating the first intercepted encrypted traffic to the law enforcement device.

10. The method of claim 9, further comprising:

communicating, to the law enforcement device, with the first intercepted encrypted traffic, the decrypted traffic generated by decryption of the first intercepted encrypted traffic.

11. A communications system, the system comprising:

a mediation device including:

a receiver;

a transmitter; and a first processor configured to operate the mediation device to:

receive, at the mediation device which processes encrypted intercepted data, a first filtering rule, said first filtering rule being that intercepted content corresponding to a first content delivery network not be forwarded to a law enforcement device;

receive, at the mediation device, a second filtering rule specifying that intercepted content corresponding to a second content delivery network and a first target be forwarded to the law enforcement device; and make, at the mediation device, a first intercepted encrypted traffic handling decision based on at least one of the first and second filtering rules.

12. The communications system method of claim 11, wherein the first content delivery network is a content delivery network used by a video service for delivery of pre-recorded movie content.

13. The communications system of claim 12, wherein the second filtering rule further specifies that second content delivery network traffic corresponding to user devices other than the first target should not be forwarded to the law enforcement device.

14. The communications system of claim 11, wherein the processor is further configured to control the mediation device to:

determine the content delivery network to which first intercepted encrypted traffic corresponds.

15. The communications system of claim 14, wherein the first intercepted encrypted traffic corresponds to the first content delivery network; and wherein the processor is further configured to control the mediation device to:

make, at the mediation device, as part of making the first intercepted encrypted traffic handling decision based on at least one of the first and second filtering rules, a decision to discard the first intercepted encrypted traffic without forwarding to the law enforcement device.

16. The communications system of claim 14, wherein determining the content delivery network to which first intercepted encrypted traffic corresponds includes determining that the first intercepted encrypted traffic corresponds to the second content delivery network.

17. The communications system of claim 16, wherein the processor is further configured to control the mediation device to:

communicate the first intercepted encrypted traffic to a security device; and receive, from the security device, decrypted traffic generated by decryption of the first intercepted encrypted traffic, said decrypted traffic including a unique identifier.

18. The communications system of claim 17, wherein the processor is further configured to control the mediation device to:

determine, based on the unique identifier included in the decrypted traffic data, traffic, that the decrypted traffic corresponds to the target.

19. The communications system of claim 18, wherein the processor is further configured to control the mediation device to:

communicate the first intercepted encrypted traffic to the law enforcement device with the decrypted traffic generated by decryption of the first intercepted encrypted traffic.

20. A non-transitory computer readable medium including computer executable instructions which when executed by a processor of a mediation device cause the mediation device to perform the steps of:

receiving, at the mediation device which processes encrypted intercepted data, a first filtering rule, said first filtering rule being that intercepted content corresponding to a first content delivery network not be forwarded to a law enforcement device;

receiving, at the mediation device, a second filtering rule specifying that intercepted content corresponding to a second content delivery network and a first target be forwarded to the law enforcement device; and making, at the mediation device, a first intercepted encrypted traffic handling decision based on at least one of the first and second filtering rules.

* * * * *